United States Patent
Akimoto

(10) Patent No.: US 9,120,012 B2
(45) Date of Patent: Sep. 1, 2015

(54) GAME SYSTEM, NON-TRANSITORY COMPUTER-READABLE STORAGE MEDIUM HAVING GAME PROGRAM STORED THEREON, GAME PROCESSING METHOD, AND GAME APPARATUS, FOR PERFORMING GAME PROCESSING BASED ON POINTED POSITIONS ON MULTIPLE, DIFFERENTLY ORIENTED, DISPLAY DEVICES

(71) Applicant: NINTENDO CO., LTD., Kyoto (JP)

(72) Inventor: Hidemasa Akimoto, Sapporo (JP)

(73) Assignee: NINTENDO CO., LTD., Kyoto (JP)

( * ) Notice: Subject to any disclaimer, the term of this patent is extended or adjusted under 35 U.S.C. 154(b) by 205 days.

(21) Appl. No.: 13/920,717

(22) Filed: Jun. 18, 2013

(65) Prior Publication Data

US 2014/0295960 A1 Oct. 2, 2014

(30) Foreign Application Priority Data

Mar. 26, 2013 (JP) ................................. 2013-064306

(51) Int. Cl.
| | |
|---|---|
| *A63F 9/24* | (2006.01) |
| *A63F 13/00* | (2014.01) |
| *A63F 13/2145* | (2014.01) |
| *A63F 13/211* | (2014.01) |
| *A63F 13/20* | (2014.01) |
| *A63F 13/213* | (2014.01) |
| *A63F 13/219* | (2014.01) |

(52) U.S. Cl.
CPC ................. *A63F 13/00* (2013.01); *A63F 13/20* (2014.09); *A63F 13/211* (2014.09); *A63F 13/213* (2014.09); *A63F 13/219* (2014.09); *A63F 13/2145* (2014.09)

(58) Field of Classification Search
CPC ......... A63F 13/02; A63F 13/04; A63F 13/10; A63F 13/12; A63F 13/20; A63F 13/211; A63F 13/213; A63F 13/2145; A63F 13/219
See application file for complete search history.

(56) References Cited

U.S. PATENT DOCUMENTS

| | | | |
|---|---|---|---|
| 2007/0060383 A1* | 3/2007 | Dohta .............................. 463/43 |
| 2010/0013695 A1* | 1/2010 | Hong et al. .................... 341/176 |
| 2011/0190052 A1* | 8/2011 | Takeda et al. ................... 463/31 |
| 2011/0234493 A1* | 9/2011 | Kravits et al. ................. 345/160 |
| 2011/0298824 A1* | 12/2011 | Lee et al. ....................... 345/633 |
| 2012/0044177 A1* | 2/2012 | Ohta et al. ..................... 345/173 |
| 2012/0115595 A1* | 5/2012 | Ohta et al. ....................... 463/30 |
| 2012/0119992 A1 | 5/2012 | Nishida et al. |

(Continued)

FOREIGN PATENT DOCUMENTS

JP 2012-108722 6/2012

*Primary Examiner* — Lawrence Galka
(74) *Attorney, Agent, or Firm* — Nixon & Vanderhye P.C.

(57) ABSTRACT

A first display device is placed so that its screen faces in a direction along a gravity direction axis, and a second display device is placed so that its screen faces in a predetermined axis direction perpendicular to the gravity direction axis. Based on data of a motion sensor which is outputted from an operation device including the motion sensor, an attitude of the operation device is calculated, and it is determined which of the first display device and the second display device the operation device faces. Then, based on the result of the determination, a predetermined position on either the screen of the first display device or the screen of the second display device is pointed to, and a predetermined game process is performed based on the pointed position.

9 Claims, 16 Drawing Sheets

(56) References Cited

U.S. PATENT DOCUMENTS

| | | | |
|---|---|---|---|
| 2012/0249443 A1* | 10/2012 | Anderson et al. | 345/173 |
| 2013/0063350 A1* | 3/2013 | Takeda et al. | 345/158 |
| 2013/0095924 A1* | 4/2013 | Geisner et al. | 463/32 |
| 2013/0335405 A1* | 12/2013 | Scavezze et al. | 345/419 |

* cited by examiner

GAME SYSTEM, NON-TRANSITORY COMPUTER-READABLE STORAGE MEDIUM HAVING GAME PROGRAM STORED THEREON, GAME PROCESSING METHOD, AND GAME APPARATUS, FOR PERFORMING GAME PROCESSING BASED ON POINTED POSITIONS ON MULTIPLE, DIFFERENTLY ORIENTED, DISPLAY DEVICES

CROSS REFERENCE TO RELATED APPLICATION

The disclosure of Japanese Patent Application No. 2013-64306, filed on Mar. 26, 2013, is incorporated herein by reference.

FIELD

The exemplary embodiments relate to a game system, a game apparatus, a non-transitory computer-readable storage medium having a game program stored thereon, and a game processing method, in which an operation device can point to a position on a screen of a display device.

BACKGROUND AND SUMMARY

Conventionally, there has been an input system which enables a user to point to a position on a screen of a display device by turning an operation device to the screen. For example, a technique has been known in which an attitude of an operation device is calculated based on a result of detection performed by a gyro sensor, and either of two screens is pointed to based on the calculated attitude.

In the above-mentioned technique, the attitude of the operation device itself is calculated. For this purpose, data obtained from both an acceleration sensor and a gyro sensor are used. That is, the technique adopts a configuration in which a plurality of sensors such as an acceleration sensor and a gyro sensor are included in the operation device. In this regard, there is room for improvement in simplifying the configuration of the operation device itself.

Therefore, it is a feature of the exemplary embodiments to provide a game system which can realize game processing in which two screens placed in different directions are appropriately used, by using a simple-configuration operation device.

In order to attain the feature described above, for example, the following configuration examples are exemplified.

A configuration example is a game system which performs a predetermined game process, based on a position that is pointed to, on a screen of a display, by an operation device including a predetermined motion sensor, and the game system includes a first display device, a second display device, an attitude calculation section, a determination section, a pointing processing section, and a game processing section. The first display device is placed so that a display screen thereof faces in a direction along a gravity direction axis. The second display device is placed so that a display screen thereof faces in a direction along a predetermined axis direction perpendicular to the gravity direction axis. The attitude calculation section calculates an attitude of the operation device, based on data outputted from the motion sensor. The determination section determines which of the screen of the first display device and the screen of the second display device is pointed to by the operation device, based on the attitude calculated by the attitude calculation section. The pointing processing section performs a process of pointing to a predetermined position on either the screen of the first display device or the screen of the second display device, based on a result of the determination by the determination section. The game processing section performs the predetermined game process, based on the position pointed to by the pointing processing section.

According to the above configuration example, it is possible to perform a game process in which two screens are appropriately used, by using an operation device of a simple configuration that includes, for example, only an acceleration sensor as a sensor for detecting a motion. In particular, since the operation device need not include a plurality of motion sensors, the above configuration is advantageous in cost of the operation device. Further, since the direction of the operation device can be determined by a simple determination process without performing complicated calculation for calculating the attitude of the operation device, reduction in processing load can be achieved.

In another configuration example, the determination section may be configured to determine whether the attitude of the operation device calculated by the attitude calculation section is: a first attitude in which, among outer surfaces of a casing of the operation device, a surface that is opposed to or substantially opposed to the display screen of the first display device or the display screen of the second display device when a player points to the display screen, faces in a direction along the gravity direction axis or a direction substantially along the gravity direction axis; or a second attitude in which the surface that is opposed to or substantially opposed to the display screen faces in a direction along a predetermined axis direction perpendicular to the gravity direction axis or a direction substantially along the predetermined axis direction. The determination section may determine, when the attitude of the operation device is the first attitude, that the operation device points to the first display device, and determine, when the attitude of the operation device is the second attitude, that the operation device points to the second display device. In addition, the motion sensor may be an acceleration sensor, and the attitude calculation section may be configured to determine the attitude of the operation device, based on acceleration data obtained from the acceleration sensor.

According to the configuration example, it is possible to determine, based on the acceleration data, which of the two screens is pointed to by the operation device. Thereby, it is possible to provide a game in which two screens are appropriately used, by using the operation device of the simple configuration.

In another configuration example, the operation device further includes an image pickup section. The game system further includes marker sections provided corresponding to the plurality of display devices, respectively. Each of the marker sections is installed such that its direction is the same as the direction of the screen of the display device corresponding to the marker section. The pointing processing section includes a pointed position calculation section configured to calculates a pointed position on the screen, based on the position of the marker section in an image captured by the image pickup section. In addition, each of the marker sections includes a light emitting member. The game system further includes a lighting control section configured to control lighting of the marker sections. The first display device is a display device that stores, in its casing, the marker section. The second display device is a television, and the marker section corresponding to the television is installed in the vicinity of the television.

According to the above configuration example, in the game system that calculates the pointed position on the screen by capturing the marker with the operation device, a game in which two screens placed in different directions are appropriately used can be provided by a simple configuration.

In another configuration example, the game processing section causes a player to perform a predetermined operation on the operation device in the state where the operation device is pointing to the screen of the first display device, thereby to perform a game process in which a predetermined object displayed on the screen of the first display device is taken by the operation device. Thereafter, the game processing section causes the player to perform a predetermined operation in the state where the operation device is pointing to the second display device, thereby to perform a game process in which the object is moved into and displayed on the screen of the second display device. In addition, the game processing section may further include: an attitude change detection section configured to detect change in the attitude of the operation device, during a period from when the game process in which the predetermined object displayed on the screen of the first display device is taken by the operation device is performed to when the player performs the predetermined operation in the state where the operation device is pointing to the second display device; a parameter change section configured to change a predetermined parameter associated with the predetermined object, in accordance with a result of the detection by the attitude change detection section; and a reflection section configured to, when the predetermined object is displayed on the screen of the second display device, reflect the parameter changed by the parameter change section, in the display of the object.

According to the above configuration example, it is possible to provide a new game in which the player is caused to perform a dynamic action, by using the two screens.

According to the exemplary embodiment, it is possible to perform a game process in which two screens are appropriately used by using an operation device of a simple configuration.

DETAILED DESCRIPTION OF NON-LIMITING EXAMPLE EMBODIMENTS

Hereinafter, an exemplary embodiment will be described.

Figure 1:
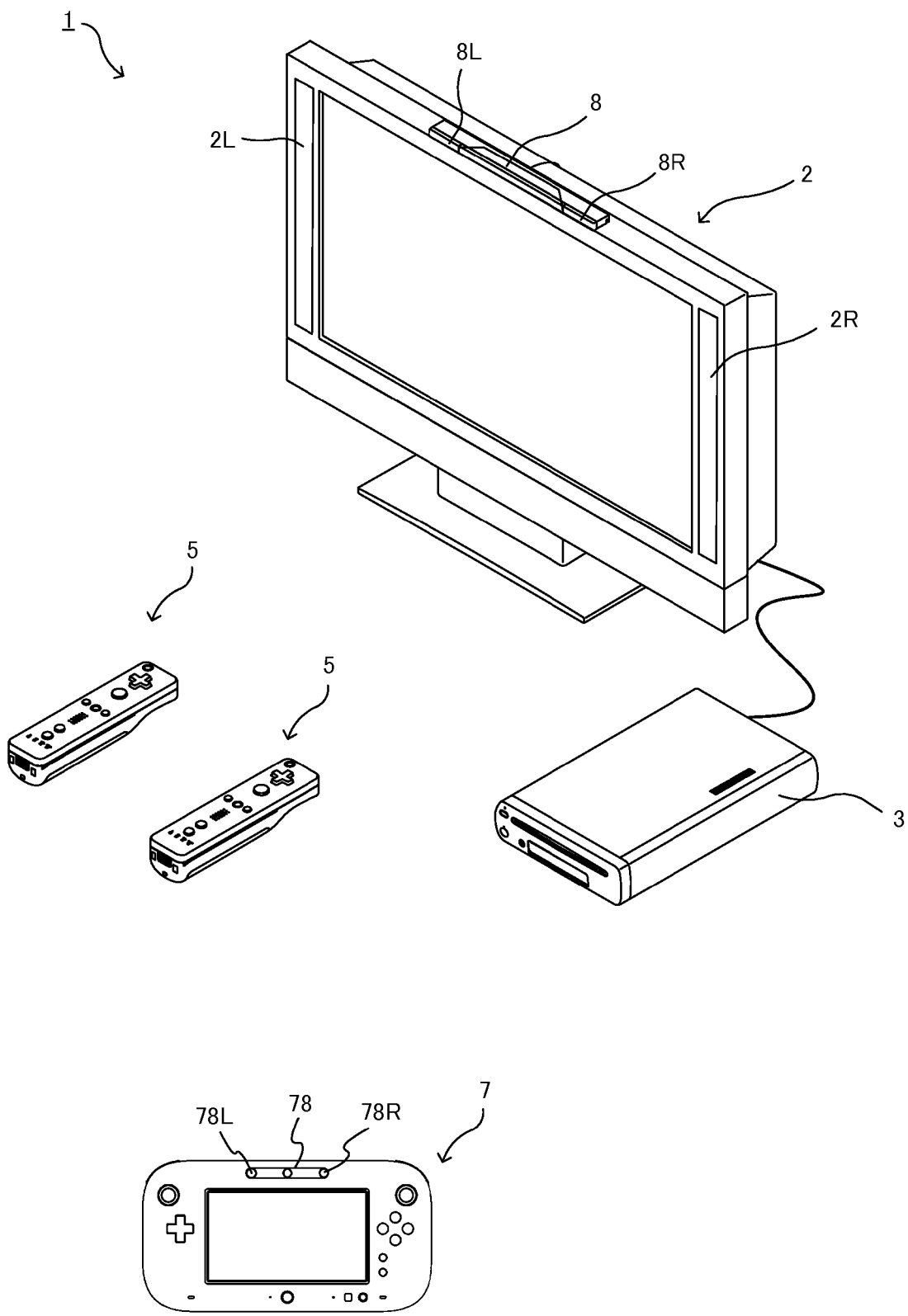
FIG. 1 is a schematic diagram showing a non-limiting example of the whole image of an information processing system according to an exemplary embodiment.

Hereinafter, a game system 1 according to the exemplary embodiment will be described with reference to the drawings. FIG. 1 is an external view of the game system 1. In FIG. 1, the game system 1 includes: a stationary display device (hereinafter, referred to as "television") 2 typified by, for example, a television receiver; a stationary game apparatus 3; controllers 5; a terminal apparatus 7; and a marker device 8. The game system 1 performs game processing in the game apparatus 3 on the basis of a game operation with each controller 5, and displays a game image obtained by the game processing, on the television 2 and/or the terminal apparatus 7.

An optical disc (not shown) which is an example of an information storage medium exchangeably used to the game apparatus 3, is detachably inserted into the game apparatus 3.

The television 2 is connected to the game apparatus 3 via a connection cord. The television 2 displays the game image obtained by the game processing performed in the game apparatus 3. It is noted that in another embodiment, the game apparatus 3 and the stationary display device may be integrated with each other. In addition, communication between the game apparatus 3 and the television 2 may be wireless communication.

In the periphery of the screen of the television 2 (above the screen in FIG. 1), the marker device 8 is installed. Although described in detail later, a user (player) can perform a game operation of moving the controller 5. The marker device 8 is used by the game apparatus 3 to calculate the motion, position, attitude and the like of the controller 5. The marker device 8 includes two markers 8R and 8L at its two ends. Specifically, the marker 8R (the same applies to the marker 8L) is composed of one or more infrared LEDs (Light Emitting Diodes), and outputs infrared light forward from the television 2. The marker device 8 is connected to the game apparatus 3, and the game apparatus 3 can control each of the infrared LEDs included in the marker device 8 to be lit on or off.

Each controller 5 provides the game apparatus 3 with operation data representing the content of an operation performed on the controller 5 itself. Each controller 5 and the game apparatus 3 are able to communicate with each other by means of wireless communication. In the exemplary embodiment, each controller 5 and the game apparatus 3 wirelessly communicate with each other using, for example, the Bluetooth (registered trademark) technology. It is noted that in another embodiment each controller 5 and the game apparatus 3 may be connected to each other in a wired manner. The game apparatus 3 is able to communicate with a plurality of controllers, and a plurality of players are allowed to play a game by simultaneously using a predetermined number of controllers. In the exemplary embodiment, it is assumed that the number of the controllers 5 included in the game system 1 is two so that two players are allowed to play a game simultaneously. The detailed configuration of each controller 5 will be described later.

The terminal apparatus 7 has a size small enough to be held by the user, and the user is allowed to move the terminal apparatus 7 with hands or place the terminal apparatus 7 at any location when using the terminal apparatus 7. Although the detailed configuration of the terminal apparatus 7 will be described later, the terminal apparatus 7 includes an LCD (Liquid Crystal Display) 71 as display means, and input means (such as a touch panel 72 and a motion sensor 82 described later). The terminal apparatus 7 and the game apparatus 3 are able to communicate with each other wirelessly (or via wired means). The terminal apparatus 7 receives, from the game apparatus 3, data of an image (e.g., a game image) generated in the game apparatus 3, and displays the image on the LCD 71. In addition, the terminal apparatus 7 transmits, to the game apparatus 3, operation data representing the content of an operation performed on the terminal apparatus 7.

Figure 2:
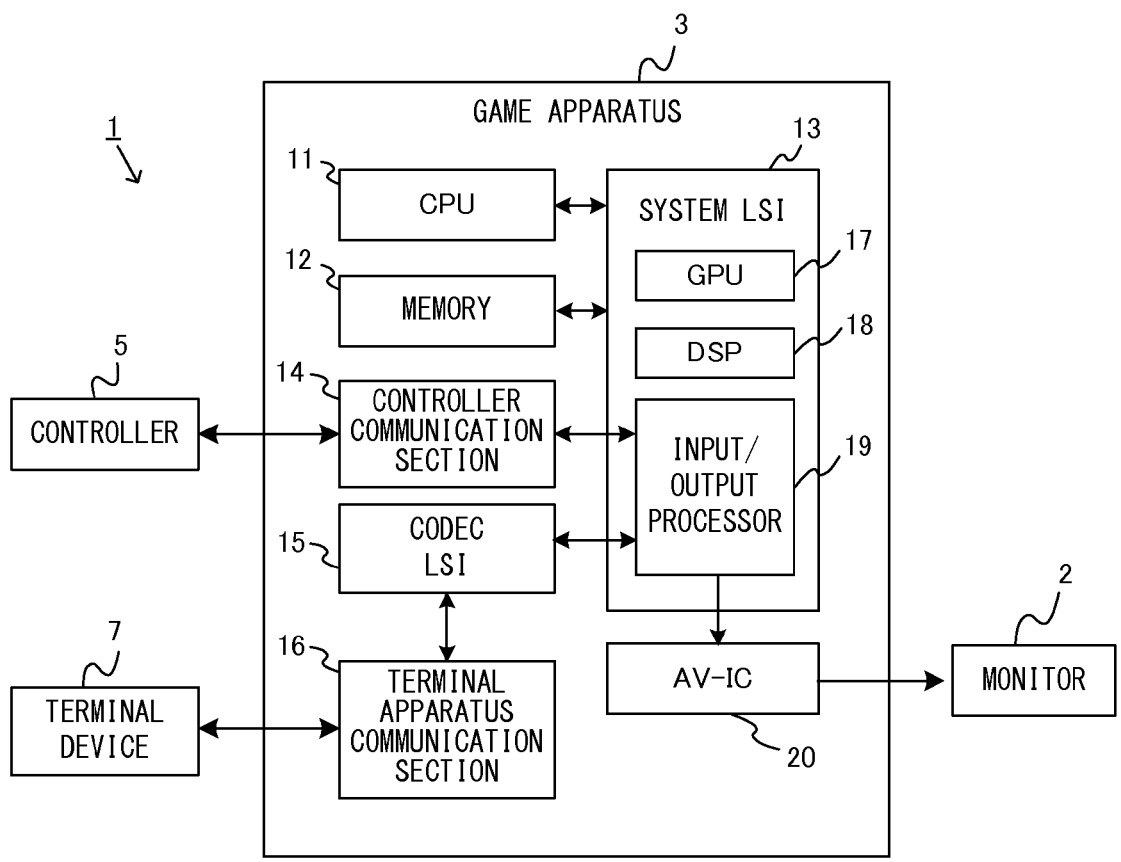
FIG. 2 is a block diagram showing a non-limiting example of the configuration of a game apparatus 3.

FIG. 2 is a block diagram of the game apparatus 3 that is an example of an information processing apparatus. In FIG. 2, the game apparatus 3 includes a CPU (control section) 11, a memory 12, a system LSI 13, a controller communication section 14, a codec LSI 15, a terminal apparatus communication section 16, an AV-IC (Audio Video-Integrated Circuit) 20, and the like.

The CPU 11 performs a predetermined information processing program (the game program in the exemplary embodiment) by using the memory 12, the system LSI 13, and the like. By so doing, various functions (e.g., the game processing) in the game apparatus 3 are realized. The CPU 11 is connected to the system LSI 13.

The system LSI 13 includes a PGU (Graphics Processor Unit) 17, a DSP (Digital Signal Processor) 18, an input-output processor 19, and the like. The GPU 17 generates an image in accordance with a graphics command (image generation command) from the CPU 11. It is noted that in the present embodiment, the game apparatus 3 generates both a game image to be displayed on the television 2 and a game image to be displayed on the terminal apparatus 7. Hereinafter, the game image to be displayed on the monitor 2 may be referred to as "television game image", and the game image to be displayed on the terminal apparatus 7 may be referred to as "terminal game image".

The DSP 18 functions as an audio processor and generates audio data using sound data and acoustic waveform (tone quality) data that are stored in the memory 12.

The input-output processor 19 transmits/receives data to/from components connected thereto, and downloads data from an external apparatus. The input-output processor 19 is connected to the controller communication section 14, the codec LSI 15, and the AV-IC 20. An antenna (not shown) is connected to the controller communication section 14. The codec LSI 15 is connected to the terminal apparatus communication section 16, and an antenna (not shown) is connected to the terminal apparatus communication section 16. The input-output processor 19 transmits/receives data to/from each controller 5 via the controller communication section 14. For example, the input-output processor 19 receives operation data transmitted from each controller 5 and stores (temporarily stores) the operation data into a buffer area of the memory 12.

Data of an image and a sound to be outputted in the television 2, among images and sounds generated in the game apparatus 3, is read by the AV-IC 20. The AV-IC 20 outputs the read image data to the television 2 via an AV connector (not shown), and outputs the read audio data via the AV connector to the speakers 2L and 2R included in the television 2. By so doing, the image is displayed on the television 2, and the sound is outputted from the speakers 2L and 2R.

The game apparatus 3 is able to transmit/receive data of images, sounds, and the like to/from the terminal apparatus 7. When transmitting a game image (terminal game image) to the terminal apparatus 7, the input-output processor 19 outputs data of a game image generated by the GPU 17, to the codec LSI 15. The codec LSI 15 performs a predetermined compression process on the image data outputted from the input-output processor 19. The terminal apparatus communication section 16 performs wireless communication with the terminal apparatus 7. Accordingly, the image data compressed by the codec LSI 15 is transmitted by the terminal apparatus communication section 16 to the terminal apparatus 7. In addition to the image data, the game apparatus 3 transmits audio data to the terminal apparatus 7. Specifically, the input-output processor 19 outputs audio data generated by the DSP 18, to the terminal apparatus communication section 16 via the codec LSI 15. Similarly to the image data, the codec LSI 15 also performs a compression process on the audio data. The terminal apparatus communication section 16 transmits the compressed image data and the compressed audio data to the terminal apparatus 7.

In addition, the game apparatus 3 transmits, as well as the image data and the audio data described above, various control data to the terminal apparatus 7 where necessary. The control data is data representing a control instruction to be given to a component included in the terminal apparatus 7. The control data represents, for example, an instruction to control a marker section (marker sections 78L and 78R shown in FIG. 5 described later). The input/output processor 19 transmits the control data to the terminal apparatus 7 in accordance with an instruction from the CPU 11.

In addition, the game apparatus 3 is able to receive various data from the terminal apparatus 7. For example, the terminal apparatus 7 transmits operation data. The input-output processor 19 stores (temporarily stores) the data received from the terminal apparatus 7, into the buffer area of the memory 12.

Figure 3:
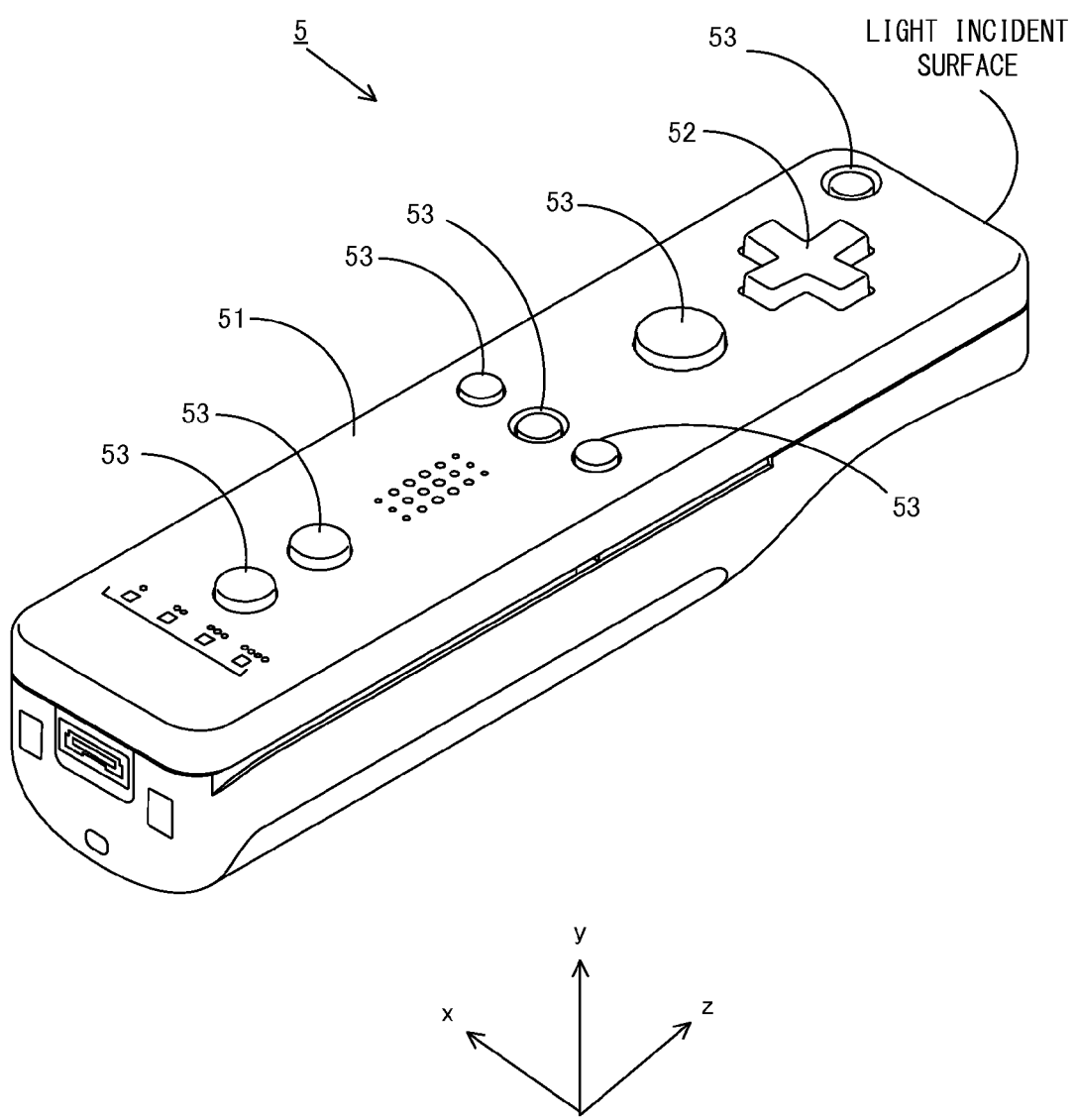
FIG. 3 is a perspective view showing a non-limiting example of the external configuration of a controller 5.

Next, the controller 5 will be described. FIG. 3 is a perspective view showing the external configuration of each controller 5. In FIG. 3, the controller 5 includes a housing 51 that is formed by, for example, plastic molding. In addition, the controller 5 includes a cross key 52, a plurality of operation buttons 53, and the like as an operation section (an operation section 61 shown in FIG. 4). The controller 5 further includes a motion sensor. The player is allowed to perform a game operation by pressing each button provided in the controller 5, and by moving the controller 5 itself to change its position and attitude.

Figure 4:
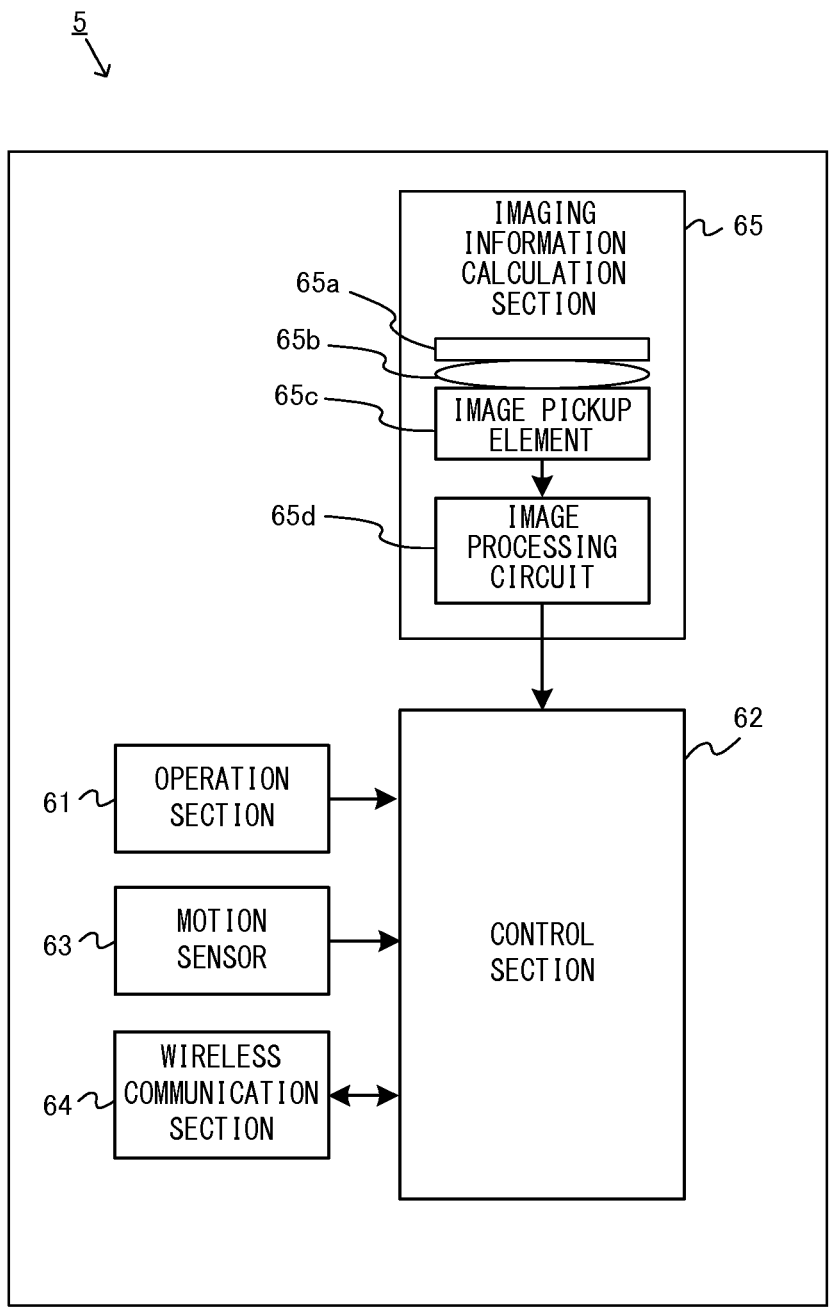
FIG. 4 is a block diagram showing a non-limiting example of the internal configuration of the controller 5.

Further, the controller 5 includes an imaging information calculation section 65 (FIG. 4). A light incident surface of the imaging information calculation section 65 is provided on the front surface of the housing 51. The light incident surface is formed of a material that allows at least infrared light from the markers 8R and 8L to pass therethrough.

FIG. 4 is a block diagram showing the configuration of each controller 5. The controller 5 includes the operation section 61 (the operation buttons 52 to 53), a control section 62, a motion sensor 63, a wireless communication section 64, and the imaging information calculation section 65. The controller 5 transmits data representing the content of an operation performed on the controller 5, as operation data to the game apparatus 3.

The control section 62 controls an operation in the controller 5. Specifically, the control section 62 receives the data outputted from the respective input sections (the operation section 61, the motion sensor 63, and the imaging information calculation section 65), and transmits the data as operation data to the game apparatus 3 via the wireless communication section 64.

The motion sensor 63 is a sensor for detecting the attitude of the controller 5. In the exemplary embodiment, an acceleration sensor is provided as an example of the motion sensor 63. The acceleration sensor can detect accelerations in three-axis (x-axis, y-axis, and z-axis) directions. More specifically, the acceleration sensor detects linear accelerations in three axial directions, i.e., the up-down direction (the y-axis direction shown in FIG. 3), a left-right direction (the x-axis direction shown in FIG. 3), and a front-rear direction (the z-axis direction shown in FIG. 3) based on the controller 5. Since the acceleration sensor 37 detects the acceleration in the linear direction along each axis, the output from the acceleration sensor 37 represents the values of the linear accelerations in the three axes. That is, the detected accelerations are represented as a three-dimensional vector in an xyz coordinate system (a controller coordinate system) set on the basis of the controller 5. It is noted that the acceleration detected by the acceleration sensor varies depending on the direction (the angle of tilt) or the movement of the controller 5, and therefore, the game apparatus 3 can calculate the direction and the movement of the controller 5 by using the obtained acceleration data. In the exemplary embodiment, the game apparatus 3 calculates the attitude, the angle of tilt, and the like of the controller 5, based on the obtained acceleration data.

Further, the controller 5 includes the wireless communication section 64 which can wirelessly communicate with the game apparatus 3. In the exemplary embodiment, the controller 5 and the game apparatus 3 wirelessly communicate with each other. However, in another embodiment, the controller 5 and the game apparatus 3 may communicate with each other via wired means.

Further, the controller 5 includes the imaging information calculation section 65. The imaging information calculation section 65 is a system for analyzing image data taken by imaging means and calculating the position of the center of gravity, the size, and the like of an area having a high brightness in the image data. The imaging information calculation section 65 has, for example, a maximum sampling period of about 200 frames/sec., and therefore, can trace and analyze even a relatively fast motion of the controller 5.

The imaging information calculation section 65 includes an infrared filter 65a, a lens 65b, an image pickup element 65c, and an image processing circuit 65d. The infrared filter 65a allows, among light incident on the front surface of the controller 5, only infrared light to pass therethrough. The lens 65b collects the infrared light having passed through the infrared filter 65a, and emits the infrared light to the image pickup element 65c. The image pickup element 65c is a solid-state image pickup device such as a CMOS sensor or a CCD sensor. The image pickup element 65c receives the infrared light collected by the lens 65b, and outputs an image signal. Here, the capturing targets, i.e., the marker device 8 and a marker section 78 of the terminal apparatus 7 described later, each include markers that output infrared light. Therefore, the provision of the infrared filter 65a allows the image pickup element 65c to receive only the infrared light having passed through the infrared filter 65a, and generate image data. This makes it possible to accurately capture the capturing targets (the marker section 78 and/or the marker device 8). Hereinafter, an image captured by the image pickup element 65c is referred to as a "captured image". The image data generated by the image pickup element 65c is processed by the image processing circuit 65d. The image processing circuit 65d calculates the positions of the capturing targets in the captured image. The image processing circuit 65d outputs coordinates representing the calculated positions to the control section 62. Data of the coordinates is transmitted from the control section 62 to the game apparatus 3 as operation data. Hereinafter, the coordinates described above are referred to as "marker coordinates". The marker coordinates change in accordance with the direction (the angle of tilt) and the position of the controller 5, and therefore, the game apparatus 3 can calculate the direction and the position of the controller 5 by using the marker coordinates.

The controller 5 also includes a loudspeaker (not shown) as sound output means.

Figure 5:
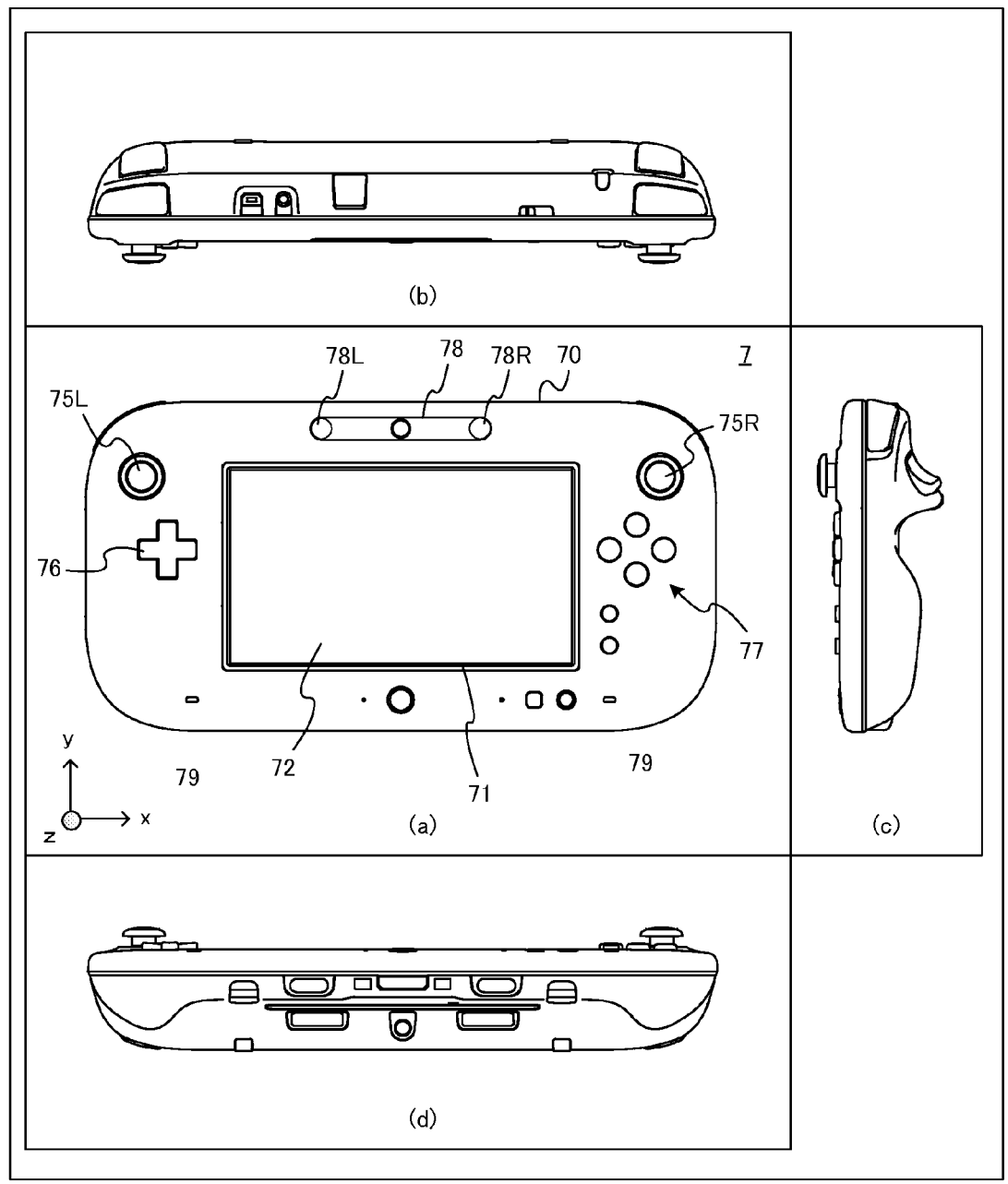
FIG. 5 is a diagram showing a non-limiting example of the external configuration of a terminal apparatus 7.

Next, the configuration of the terminal apparatus 7 will be described with reference to FIG. 5. FIG. 5 is a diagram showing the external configuration of the terminal apparatus 7. In FIG. 5, (a) is a front view of the terminal apparatus 7; (b) is a top view of the terminal apparatus 7; (c) is a right side view of the terminal apparatus 7; and (d) is a bottom view of the terminal apparatus 7.

As shown in FIG. 5, the terminal apparatus 7 includes a housing 70 that generally has a plate-like horizontally-long rectangular shape. The housing 70 has a size small enough to be held by the user. Therefore, the user is allowed to move the terminal apparatus 7 with hands or change the location of the terminal apparatus 7.

The terminal apparatus 7 includes the LCD 71 on a front surface of the housing 70. The LCD 71 is provided near the center of the front surface of the housing 70. In addition, the terminal apparatus 7 includes, as one of operations means, a touch panel 72 on the screen of the LCD 71. Further, the terminal apparatus 7 includes, as operation means, two analog sticks 75L and 75R, a cross button 76, and a plurality of buttons 77 (corresponding to an operation section 81 shown in FIG. 6). Each of the analog sticks 75L and 75R is a device for designating a direction.

Further, the terminal apparatus 7 includes loudspeakers as sound output means. As shown in FIG. 5(d), speaker holes 79 are provided in the lower side surface of the housing 70. A sound is output through the speaker holes 79 from the loudspeakers. In the exemplary embodiment, the terminal apparatus 7 has two loudspeakers, and the speaker holes 79 are provided at positions corresponding to a left loudspeaker and a right loudspeaker.

As shown in FIG. 5(a), the terminal apparatus 7 includes a marker section 78 including markers 78L and 78R on the front surface of the housing 70. The marker section 78 is provided above the LCD 71. Similarly to the markers 8L and 8R of the marker device 8, the markers 78L and 78R are each composed of one or more infrared LEDs. Similarly to the marker device 8 described above, the marker section 78 is used to cause the game apparatus 3 to calculate the motion of the controller 5, and the like. The game apparatus 3 is capable of controlling the infrared LEDs of the marker section 78 to be lit on or off.

Figure 6:
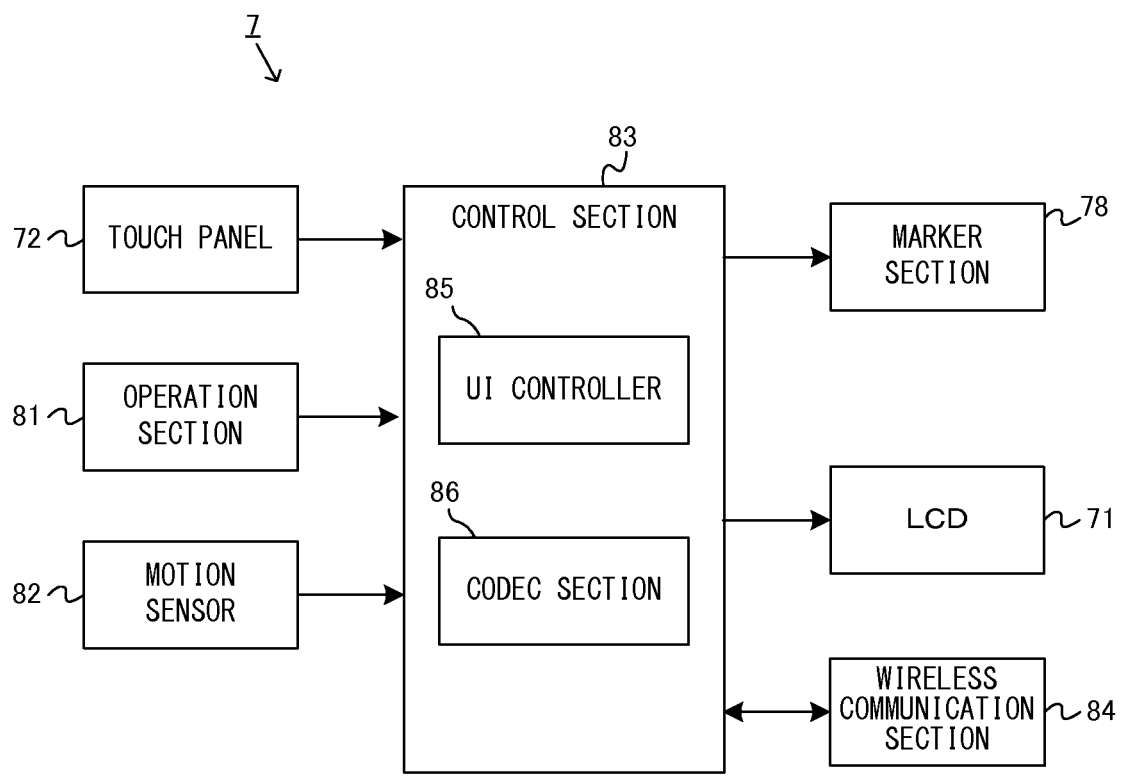
FIG. 6 is a block diagram showing a non-limiting example of the internal configuration of the terminal apparatus 7.

Next, the internal configuration of the terminal apparatus 7 will be described with reference to FIG. 6. FIG. 6 is a block diagram showing the internal configuration of the terminal apparatus 7. As shown in FIG. 6, in addition to the components shown in FIG. 5, the terminal apparatus 7 includes a control section 83, a wireless communication section 84, a motion sensor 82, and the like. These electronic components are mounted on an electronic circuit substrate and accommodated in the housing 70.

The motion sensor 82 is a sensor for detecting the attitude of the terminal apparatus 7. In the exemplary embodiment, an acceleration sensor, an angular velocity sensor, and a magnetic sensor, as examples of the motion sensor 82.

The control section 83 includes an UI controller 85, a codec section 86, and the like. The UI controller 85 controls input/output of data to/from the respective input/output sections. The codec section 86 performs a compression process on data to be transmitted to the game apparatus 3, and a decompression process on data transmitted from the game apparatus 3. The control section 83 transmits the operation data obtained from the touch panel 72, the operation section 81 (the analog sticks 75L and 75R, the cross button 76, and the plurality of buttons 77), and the motion sensor 82, to the game apparatus 3 via the wireless communication section 84, as terminal operation data. As described above, the compressed image data and sound data are transmitted from the game apparatus 3 to the terminal apparatus 7. These data are transmitted to the control section 83 via the wireless communication section 84. The (codec section 86 of) control section 83 decompresses the received image data and sound data. The decompressed image data is output to the LCD 71, and an image is displayed on the LCD 71 (a terminal game image is displayed). Meanwhile, the decompressed sound data is output to a sound IC (not shown), and the sound IC causes loudspeakers (not shown) to output a sound (a terminal game sound is output).

Next, an outline of game processing performed in the game system 1 according to the exemplary embodiment will be described with reference to FIGS. 7 to 15. The game system 1 enables an operation (pointing operation) of pointing to a position on a screen of each of two display devices, i.e., the television 2 and the terminal apparatus 7, by using the controller 5.

In the game processing assumed in the exemplary embodiment, a plurality of players are allowed to play a game. In the following description, a case where two players play a game will be described. In this game, each player holds a controller 5, points to the screen of the television 2 or the screen of the terminal apparatus 7 with the controller 5, and performs a predetermined operation (in other words, each player performs an operation such as capturing the marker device 8 or the marker section 78 with the controller 5). Thus, the game is progressed.

Figure 7:
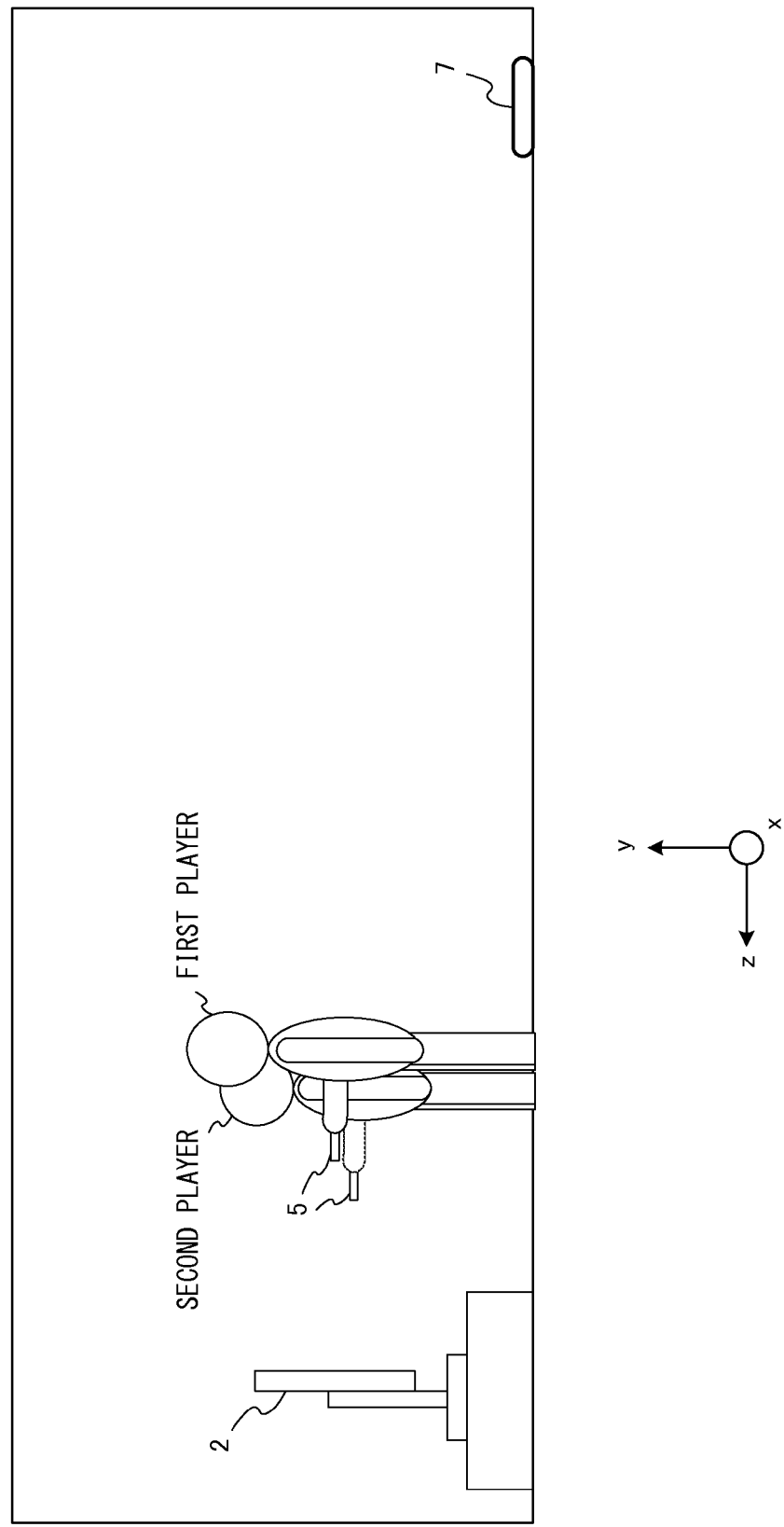
FIG. 7 is a diagram showing an outline of game processing performed in the exemplary embodiment.

Specific examples of screens and player's operations in the game assumed in the exemplary embodiment will be described. First, in the exemplary embodiment, the terminal apparatus 7 is placed so as to be parallel to the floor as shown in FIG. 7. FIG. 7 is a schematic diagram showing the state immediately after the game has started. At this time, the terminal apparatus 7 is placed so that the LCD 71 of the terminal apparatus 7 faces upward. In other words, the terminal apparatus 7 is placed so that the LCD 71 faces in a direction along a gravity direction axis. In contract, the television is placed so that the screen of the television 2 faces in a direction along an axis perpendicular to the gravity direction axis. In the example of FIG. 7, the LCD 71 faces in the positive direction of the y axis that is the gravity direction axis, and the screen of the television 2 faces in the negative direction of the z axis.

The terminal apparatus 7 is preferably placed at some distance from the television 2. For example, the terminal apparatus 7 is placed at a position 1 to 2 m distant from the television 2.

On the premise of the positional relation between the terminal apparatus 7 and the television 2, the following game processing is performed in the exemplary embodiment. The exemplary game is a game of a water scooping race. In this game, each controller 5 is likened to a "ladle", the terminal apparatus 7 is likened to a "stream", and the television 2 is likened to a "container for water". Each player performs an operation of scooping "water" from the terminal apparatus 7 as a "stream" by using the controller 5 as a "ladle". Then, the player performs an operation of conveying the "water" to the television 2 as the "container for water", and pouring the "water" into the "container". Since such a game is assumed, it is preferable that the terminal apparatus 7 is placed at some distance from the television 2.

Figure 8:
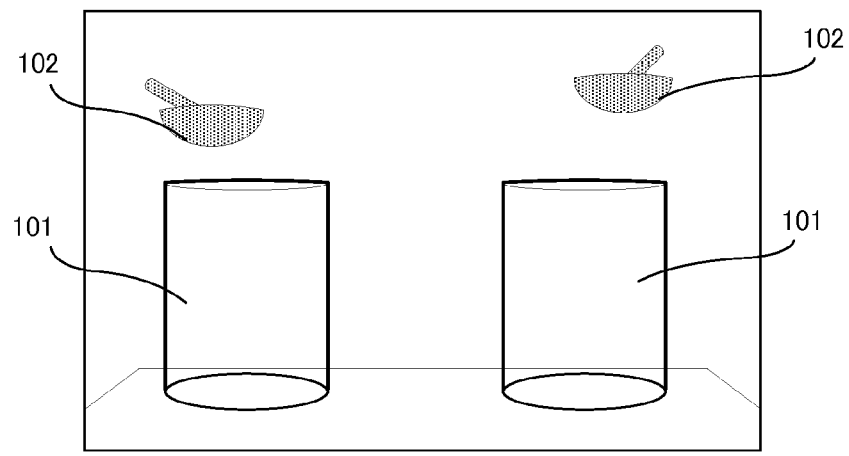
FIG. 8 is a non-limiting example of a game screen.

FIG. 8 shows an example of a television-side game image displayed on the television 2 in this game. In FIG. 8, images of two container objects 101 in which water is to be put, and images of two ladle objects 102 are displayed. The ladle object 102 and the container object 101 on the left side in FIG. 8 are assigned to the first player, and the ladle object 102 and the container object 101 on the right side are assigned to the second player. Each ladle object 102 also serves as a pointer indicating a pointing position of each controller 5. That is, each ladle object 102 is present at a position, in the virtual game space, corresponding to the on-screen pointing position of each controller. Further, the attitude of the ladle object 102 is in conjunction with the attitude of the controller 5. Specifically, when the attitude of the controller 5 is that the front surface thereof (the surface having the light incident surface) faces the television 2, and the top surface thereof (the surface having the cross key 52 and the plurality of operation buttons 53) faces upward (hereinafter this attitude is referred to as an horizontal attitude), the ladle object 102 is also in the horizontal state (in the state where a hemispherical portion of the ladle faces upward). From this state, if the controller 5 is rotated 90 degrees about the z-axis (either leftward or rightward), the attitude (image) of the ladle object 102 is changed such that the ladle object 102 is also rotated 90 degrees in accordance with the rotation direction of the controller 5.

Figure 9:
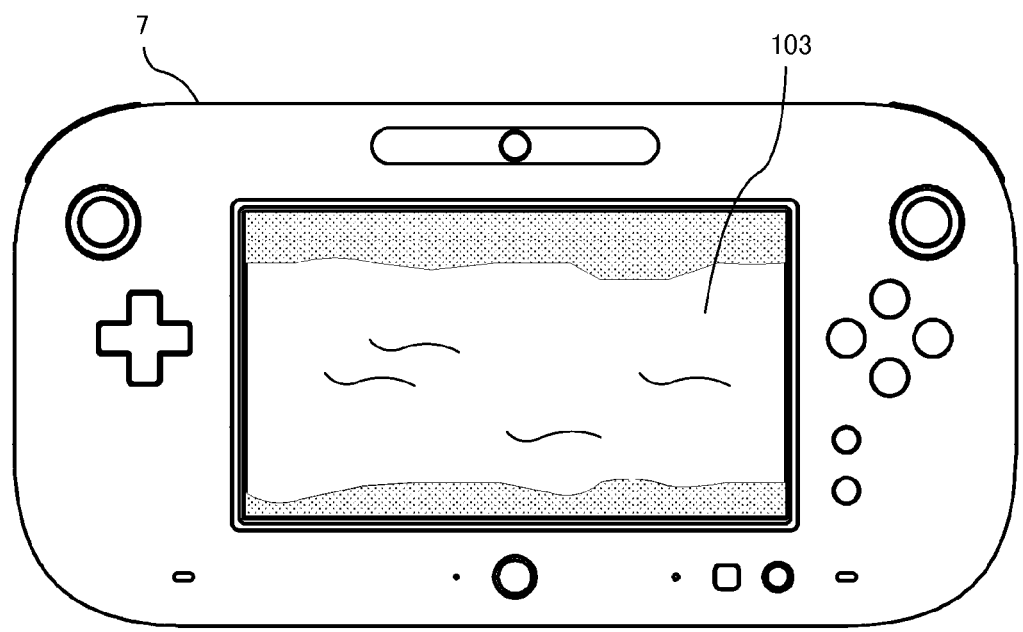
FIG. 9 is a non-limiting example of a game screen.

FIG. 9 shows an example of a terminal-side game image displayed on the LCD 71 of the terminal apparatus 7. On the LCD 71, an image of a stream object 103 in which water flows is displayed.

Figure 10:
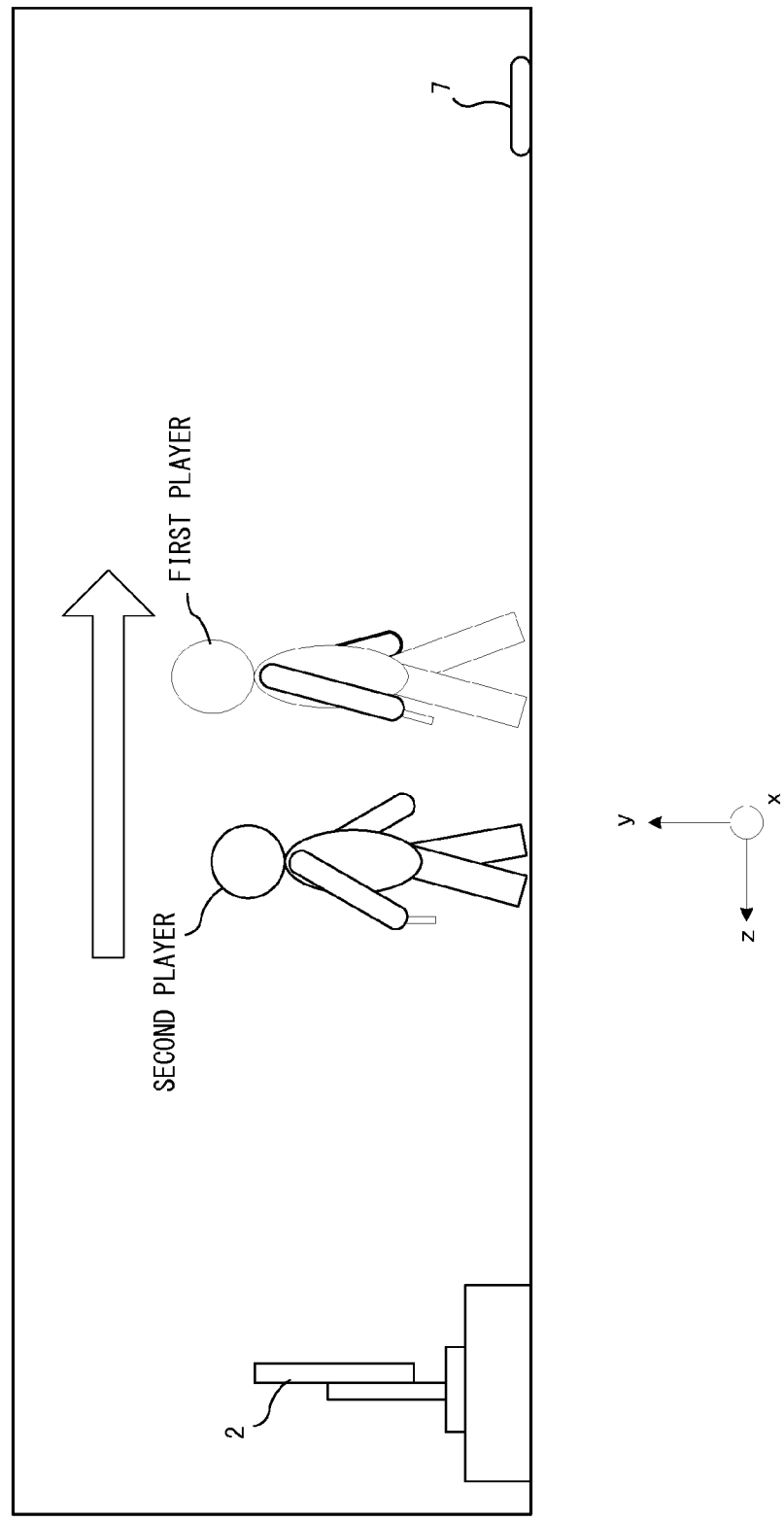
FIG. 10 is a diagram showing an outline of game processing performed in the exemplary embodiment.

Next, examples of specific game flow and operation will be described. In the state shown in FIG. 7, for example, an image that informs start of the game (water scooping race) is displayed on the screen of the television 2. Thereafter, each player, holding the controller 5 in his/her hand, moves toward the position where the terminal apparatus 7 is placed, as shown in FIG. 10.

Figure 11:
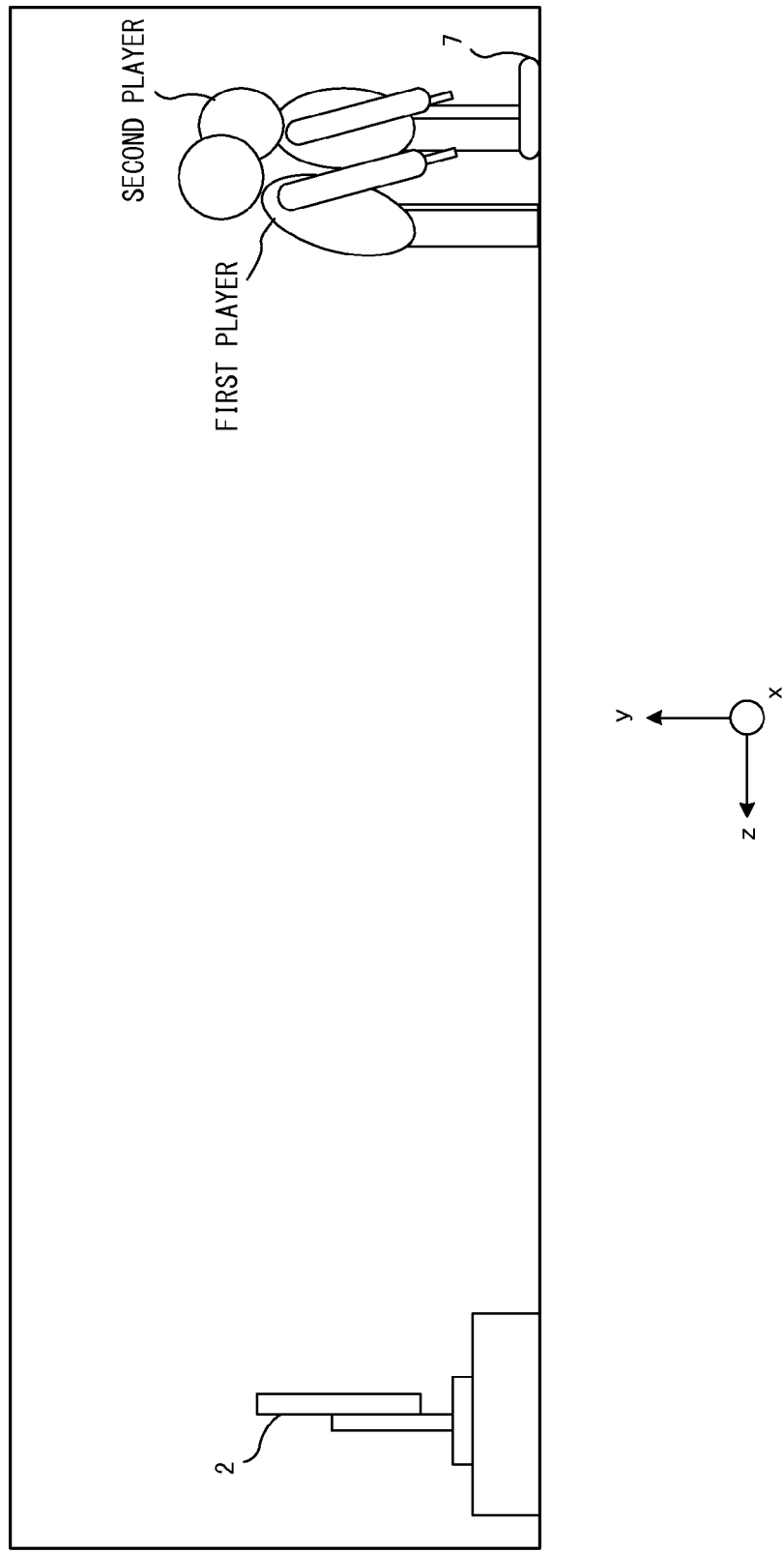
FIG. 11 is a diagram showing an outline of game processing performed in the exemplary embodiment.

Next, when each player arrives at the position where the terminal apparatus 7 is placed, as shown in FIG. 11, each player directs the front surface of the controller 5 at the terminal apparatus 7 (thereby, the marker section 78 of the terminal apparatus 7 is captured by the controller 5). In other words, each player points to the LCD 71 with the controller 5. At this time, the attitude of the controller 5 is that the front surface thereof faces substantially in the gravity direction (vertically downward) (hereinafter such an attitude is referred to as a downward attitude). At this time, no ladle object 102 is displayed on the television 2, because the controller 5 is not capturing the marker device 8 on the television 2 side.

Figure 12:
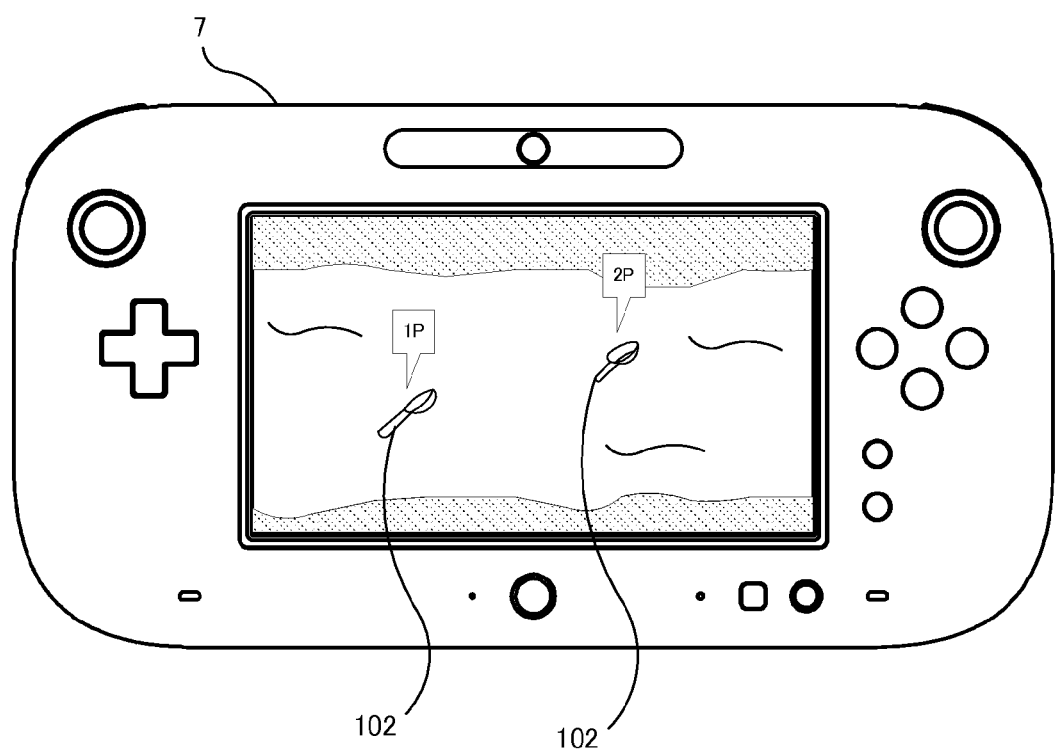
FIG. 12 is a non-limiting example of a game screen.

FIG. 12 shows an example of a game image displayed on the terminal apparatus 7 at this time. In FIG. 12, the ladle object 102 corresponding to each player is displayed. On this screen, when each player performs an operation of raising the controller 5 upward, the player can scoop water from the stream object. Specifically, by changing the attitude of the controller 5 to the above-mentioned horizontal attitude, the player can scoop water. When the player has scooped water (when the attitude of the controller 5 has changed to the horizontal attitude), since the controller 5 is not capturing the marker section 78 of the terminal apparatus 7, the ladle object 102 is erased from the image on the LCD 71 side (the terminal game image).

Figure 13:
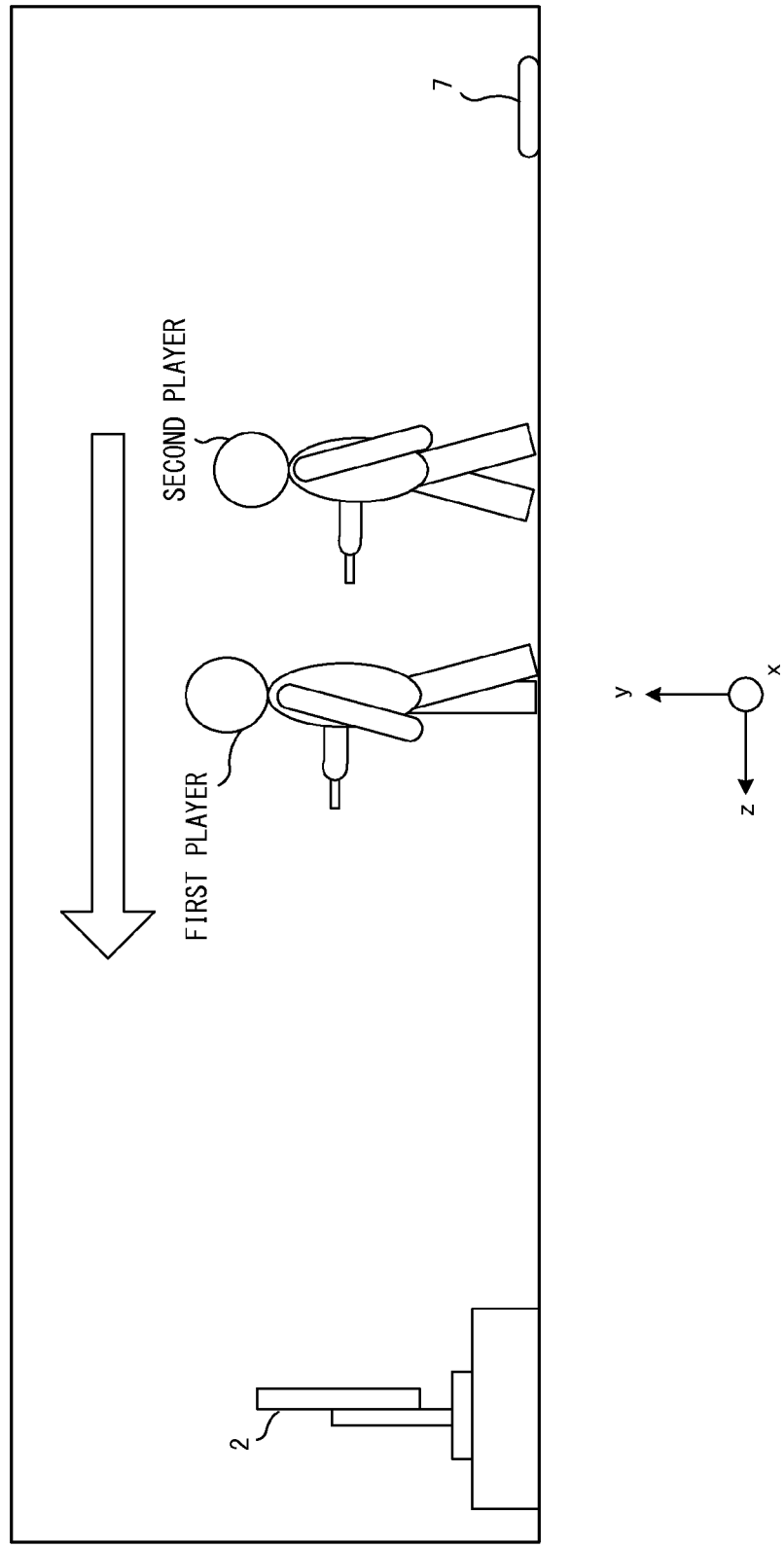
FIG. 13 is a diagram showing an outline of game processing performed in the exemplary embodiment.

After each player has scooped water, each player, holding the controller 5 in his/her hand, moves to the position where the television 2 is placed, as shown in FIG. 13. In the exemplary embodiment, during this movement, change in the attitude of the controller 5 is detected to determine whether or not water spills from the controller 5 likened to the ladle. Therefore, each player needs to keep the controller 5 in the horizontal attitude as much as possible (so as to prevent the water from spilling out of the ladle) until arriving at the television 2.

Figure 14:
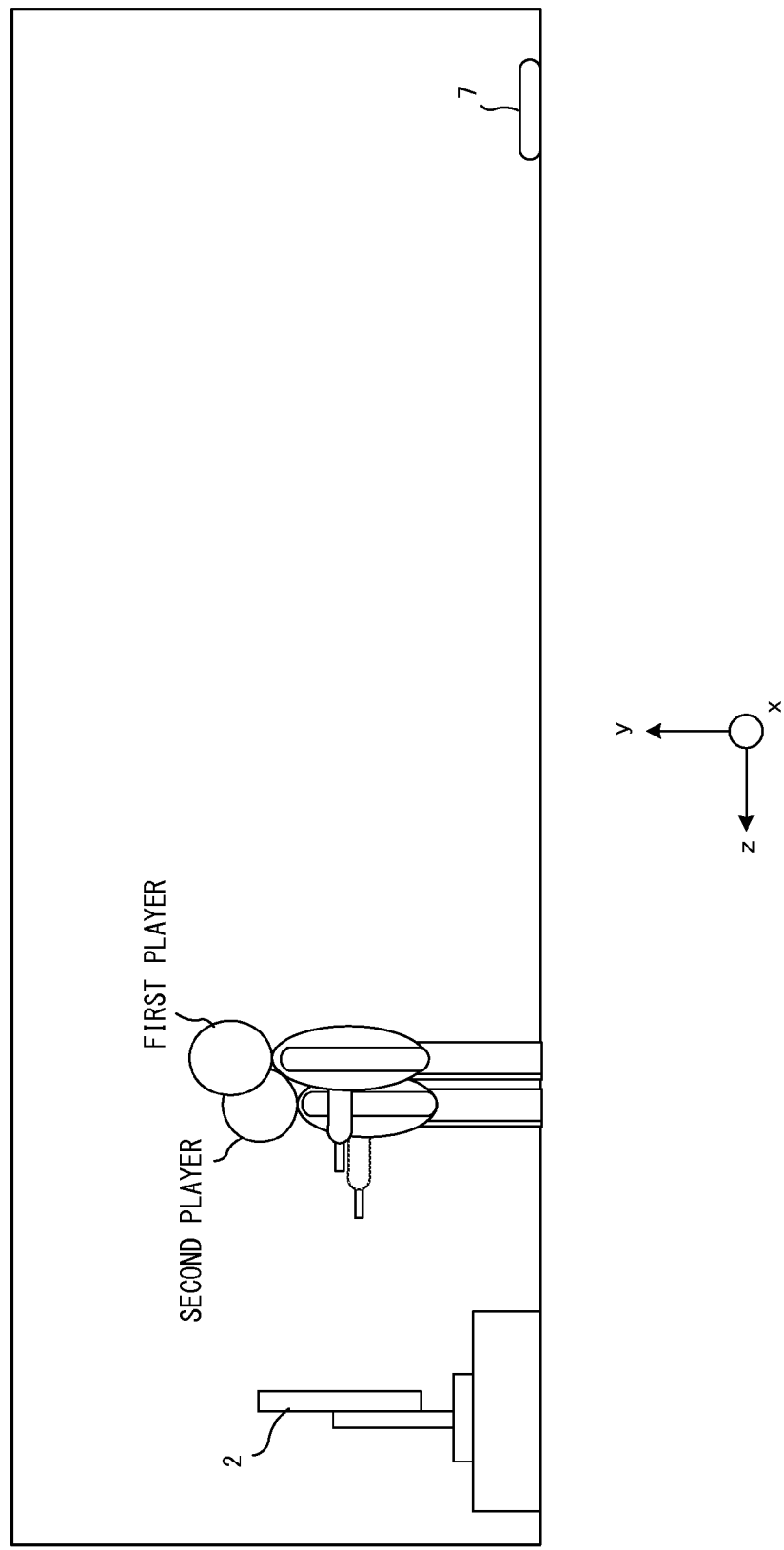
FIG. 14 is a diagram showing an outline of game processing performed in the exemplary embodiment.
Figure 15:
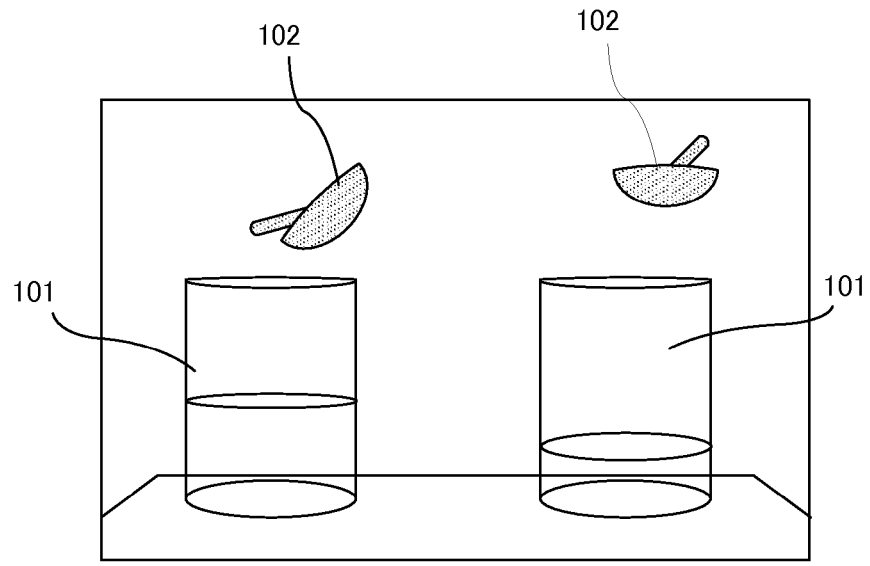
FIG. 15 is a non-limiting example of a game screen.

Then, as shown in FIG. 14, when each player has arrived at the television 2, the ladle object 102 is displayed at a position, on the screen (in the virtual game space), corresponding to the pointing position of the controller. Then, as shown in FIG. 15, each player performs an operation of pointing to an upper portion of the container object 101 assigned to the player, and appropriately twisting the controller 5 (rotating the controller 5 90 degrees about the z-axis, rightward or leftward). Thus, the player can pour the water into the container object 101. It is noted that, regarding the amount of water at this time, the amount of water "spilled" while the player has moved from the terminal apparatus 7 to the television 2 is reflected. That is, the amount of water is obtained by subtracting the amount of "spilled" water.

Then, each player repeatedly moves back and forth between the television 2 and the terminal apparatus 7, and thus the water scooping race game according to the exemplary embodiment is progressed.

By the way, in the above-mentioned game, it is needed to determine which of the screen of the television 2 and the screen of the LCD 71 of the terminal apparatus 7 is pointed to by the controller 5. In particular, since the marker device 8 and the marker section 78 of the exemplary embodiment are basically devices that merely emit infrared light, each of the marker device 8 and the marker section 78 cannot be identified alone (that is, it is not configured to output a signal for identification, or the like). Therefore, even when the operation data transmitted from the controller 5 indicates that the controller 5 recognizes a marker (for example, the operation data includes an effective value as data of marker coordinates), such data is not sufficient to determine which of the marker device on the television 2 side and the marker section of the terminal apparatus 7 is recognized by the controller 5. So, the exemplary embodiment adopts the configuration as follows. That is, the direction in which (the front surface of) the controller 5 faces is calculated based on acceleration data outputted from the controller 5, and it is determined which of the television 2 and the terminal apparatus 7 is pointed to by the controller 5.

Specifically, in the exemplary embodiment, based on the value of a z-axis acceleration of the acceleration data, it is determined whether the attitude of the controller 5 is the downward attitude or the horizontal attitude. Since the terminal apparatus 7 is placed in parallel to the floor as described above, the front surface of the controller 5 needs to be directed in the gravity direction in order to point to the terminal apparatus 7 with the controller 5. Therefore, when the attitude of the controller 5 is that the front surface faces vertically downward or substantially vertically downward, it can be estimated that the player directs the controller 5 to the terminal apparatus 7.

As described above, in the exemplary embodiment, the direction (attitude) of the controller 5, that is, which of the television 2 and the terminal apparatus 7 is pointed to by the controller 5 can be determined based on the acceleration data. Thereby, in the game processing using the two screens placed as described above, even a controller of a simple configuration having only an acceleration sensor as a motion sensor enables the process in which the two screens are appropriately used.

Figure 16:
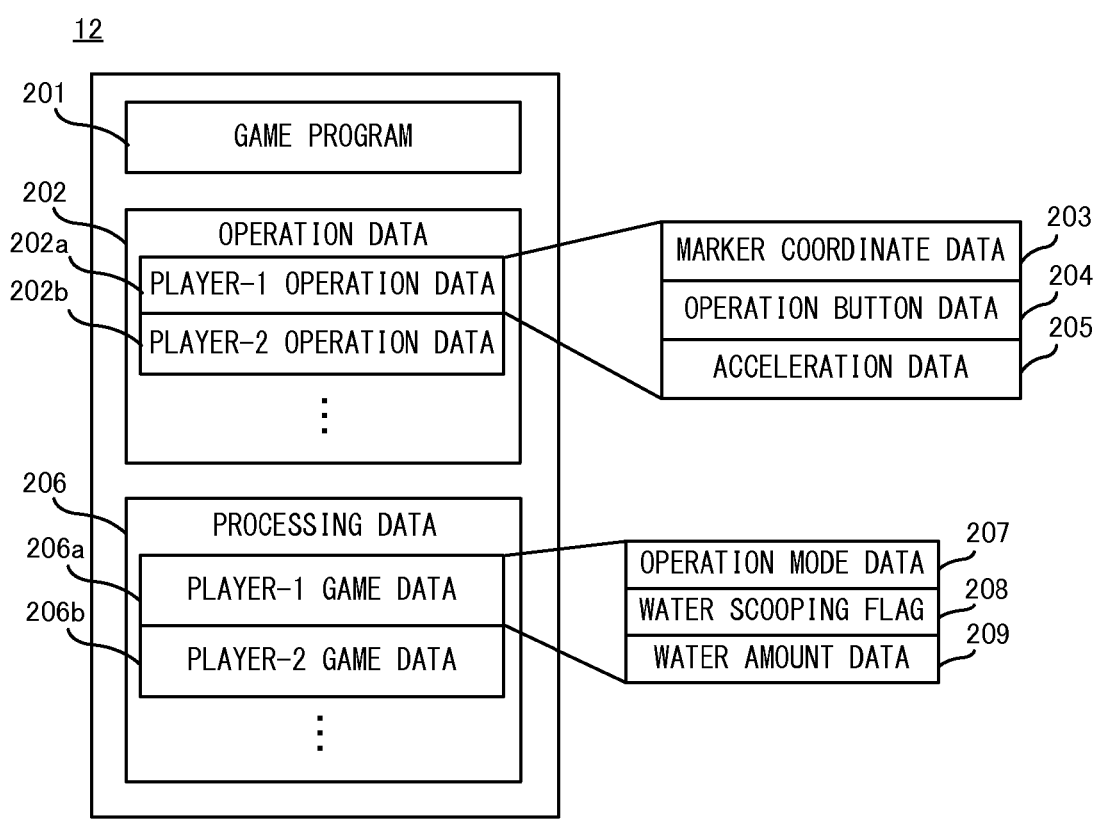
FIG. 16 is a diagram showing various kinds of data used in the game processing.

Next, with reference to FIGS. 16 to 18, the operation of the game apparatus 3 according to the exemplary embodiment will be described in detail. First, various data used in the game processing will be described. FIG. 16 is a diagram showing various data used in the game processing. FIG. 16 shows main data stored in the memory 12 of the game apparatus 3. As shown in FIG. 16, the memory 12 of the game apparatus 3 stores a game program 201, operation data 202, and processing data 206. It is noted that the memory 12 stores, in addition to the data shown in FIG. 16, data desired for the game such as image data of various objects that appear in the game, audio data used in the game, and the like.

The game program 201 is stored in the memory 12 such that some or all of the game program 201 is loaded from the optical disc at an appropriate time after the game apparatus 3 has been powered on. It is noted that the game program 201 may be obtained from a flash memory or an external device of the game apparatus 3 which are not shown (via the Internet, for example), instead of from the optical disk. In addition, some of the game program 201 (for example, a program for calculating the attitudes of the controller 5 and/or the terminal apparatus 7) may be stored in advance in the game apparatus 3.

The operation data 202 is data representing an operation performed on the controller 5 by each user. In FIG. 16, the operation data 202 includes player-1 operation data 202a and player-2 operation data 202b (hereinafter, collectively referred to as "operation data"). The operation data 202 is transmitted from the controller 5 and obtained in the game apparatus 3. The operation data 202 includes marker coordinate data 203, operation button data 204, and acceleration data 205. It is noted that the memory 12 may store a predetermined number of operation data in order from the latest (most recently obtained) operation data.

The marker coordinate data 203 is data representing the coordinates calculated by the image processing circuit 65d of the imaging information calculation section 65, that is, data representing marker coordinates. The marker coordinates are represented by a two-dimensional coordinate system for representing a position, on a plane, corresponding to a captured image, and the marker coordinate data 203 represents coordinate values on the two-dimensional coordinate system. It is noted that, when the two markers 8L and 8R of the marker device 8 are captured by the image pickup device 65c, two sets of marker coordinates are calculated, and the marker coordinate data 203 represents the two sets of marker coordinates. On the other hand, when either one of the markers 8L and 8R is placed outside the range that can be captured by the image pickup device 65c, only the other one is captured by the image pickup device 65c, and only one set of marker coordinates is calculated. As a result, the marker coordinate data 203 represents the one set of marker coordinates. Alternatively, when both the markers 8L and 8R are placed outside the range that can be captured by the image pickup device 65c, no markers are captured by the image pickup device 65c, and no marker coordinates are calculated. Therefore, the marker coordinate data 203 may represent two sets of marker coordinates, may represent one set of marker coordinates, or may represent that no marker coordinates are present (the same as above can be said for the marker section 78 of the terminal apparatus 7).

It is noted that not the marker coordinate data but the image data itself of the captured image may be transmitted from the controller 5 to the game apparatus 3. That is, the controller 5 may transmit either the marker coordinate data or the image data itself, as capturing data relating to the captured image by the image pickup device (image pickup element 40). When receiving the image data of the captured image from the controller 5, the game apparatus 3 may calculate the marker coordinates from the image data of the captured image, and store the marker coordinates as the marker coordinate data in the memory 12.

The operation button data 95 is data representing the input state of each of the operation buttons provided on the controller 5.

The acceleration data 205 is data representing the acceleration (acceleration vector) detected by the motion sensor 63 of the controller 5. In the exemplary embodiment, the acceleration data 205 represents a three-dimensional acceleration consisting of components representing accelerations in the directions of the three axes, i.e., the x-axis, the y-axis, and the z-axis shown in FIG. 3. In another embodiment, the acceleration data 205 may represent accelerations in given one or more directions.

Figure 17:
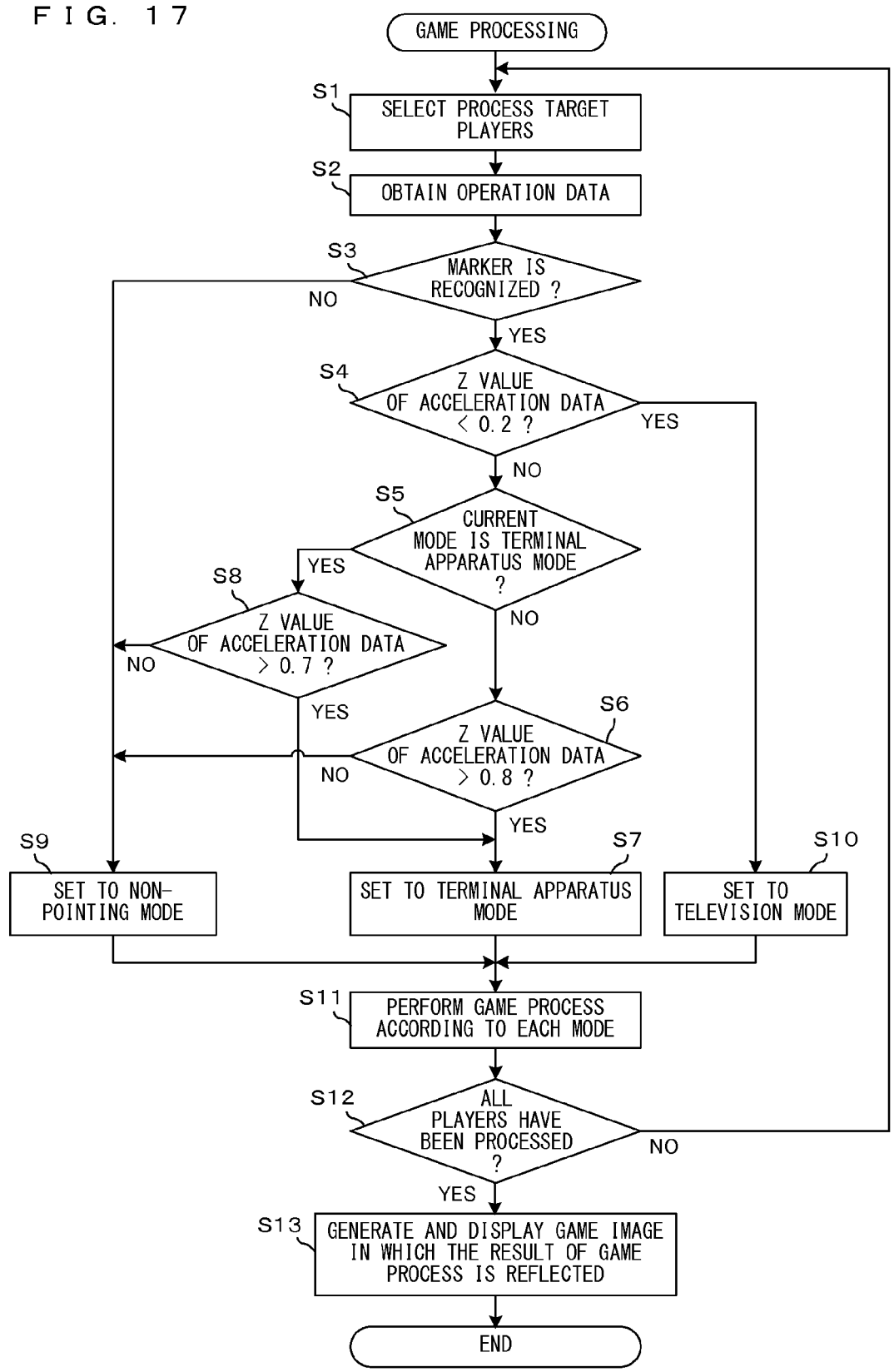
FIG. 17 is a flowchart showing in detail the game processing of the exemplary embodiment.
Figure 18:
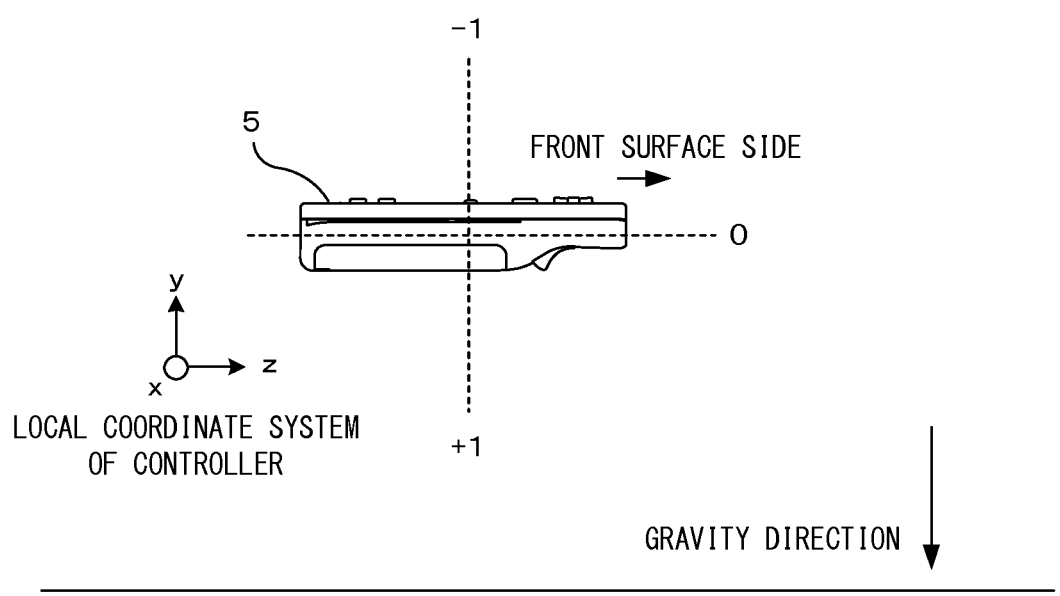
FIG. 18 is a diagram showing correspondence between the direction of a controller 5 and a z-axis acceleration.

The processing data 206 is data used in game processing described later (FIG. 17). The processing data 206 includes player-1 game data 206a, player-2 game data 206b, and the like. It is noted that the processing data 206 includes, in addition to the data shown in FIG. 16, various data used in the game processing, such as data representing various parameters set on the respective objects.

The player-1 game data 206a is game data used for the first player. The player-2 game data 206b is game data used for the second player. Since the exemplary embodiment assumes the case where two players play a game, the game data for two players are shown. However, game data may be appropriately generated in accordance with the number of players who simultaneously play the game. The game data of each player includes operation mode data 207, a water scooping flag 208, and water amount data 209.

The operation mode data 207 is data representing the operation mode of the controller 5. In the exemplary embodiment, data representing any one of the following three operation modes is appropriately set in the operation mode data 207 by a process described later. In the exemplary embodiment, a television mode, a terminal apparatus mode, and a non-pointing mode are set. The television mode is a mode in which it is assumed that (the front surface of) the controller 5 is pointed to the television. The terminal apparatus mode is a mode in which it is assumed that the controller 5 is pointed to the terminal apparatus 7. The non-pointing mode is a mode in which it is assumed that the controller 5 points neither to the television 2 nor to the terminal apparatus 7. As an initial value at the start of the game, the non-pointing mode is set.

The water scooping flag 208 is a flag indicating whether or not the player is in the state where he/she performs an operation of scooping water with the controller 5 likened to a ladle and conveys the water to the container object. If the flag is ON, it means that the player is in the state where he/she scoops and conveys water (the state where water is in the ladle). The initial value of the flag is set to OFF. The water amount data 209 is a parameter indicating the amount of water that the player conveys. As described above, the amount of water decreases if "the water spills" while the player moves from the terminal apparatus 7 toward the television 2.

Next, with reference to a flowchart of FIG. 17, the flow of the game processing performed by the CPU 11 of the game apparatus 3 will be described. In the flowchart shown in FIG. 17, processes relating to determination as to which of the television 2 and the terminal apparatus 7 the controller 5 points to, which is performed based on the operation relating to the controller 5, will be mainly described, while processes not directly related to the exemplary embodiment are not described in detail.

It is noted that the processes in the respective steps in the flowchart shown in FIG. 17 are merely examples, and therefore, the order of the process steps may be changed as long as the same result is obtained. In addition, the values of the variables, and the thresholds used at determination steps are also merely examples, and other values may be used according to need. Further, in the exemplary embodiment, a description is given of the case where the CPU 11 performs the processes of the steps in the flowchart. However, a processor other than the CPU 11 or a dedicated circuit may perform the processes of some steps in the flowchart.

When the game processing is started, the CPU 11 performs an initial process (not shown). The initial process may include: constructing a virtual game space; locating each object that appears in the game space, at an initial position; and setting the initial values of the various parameters used in the game processing. After the initial process has been completed, a processing loop including a series of processes of steps S1 through S13 is performed, for each player, every predetermined period (one frame period) and repeated.

First, in step S1, the CPU 11 selects players to be the targets of the following processes (hereinafter referred to as "process target players") from among unprocessed players. In the exemplary embodiment, the CPU 11 firstly selects the first player as a process target, and then selects the second player as a process target.

Next, in step S2, the CPU 11 obtains operation data from the controllers 5 of the process target players. The controller 5 repeatedly transmits the data outputted from the motion sensor 63, the imaging information calculation section 65, and the operation section 61, to the game apparatus 3, as the operation data. Upon sequentially receiving the data from the controller 5, the game apparatus 3 sequentially stores the data in the memory 12 as the operation data. In step S2, the CPU 11 reads, from the memory 12, the latest operation data 202 relating to the process target players. Since the terminal apparatus 7 is not used as an operation device in the exemplary embodiment, the following description will be made on assumption that the CPU 11 obtains no operation data from the terminal apparatus 7.

Next, in step S3, the CPU 11 determines whether or not the controller 5 of each process target player recognizes the marker device 8 or the marker section 78 (hereinafter sometimes collectively referred to as "marker"). Specifically, the CPU 11 determines whether or not the marker device 8 or the marker section 78 is captured by the image pickup means (image pickup element 65c) of the controller 5. The CPU 11 can perform the determination in step S3 by referring to the marker coordinate data 203 stored in the memory 12. In the exemplary embodiment, when the marker coordinate data 203 represents two sets of marker coordinates, the CPU 11 determines that the marker device 8 or the marker section 78 is captured (that is, the marker is recognized). When the marker coordinate data 203 represents only one set of marker coordinates or represents no marker coordinates, the CPU 11 determines that the marker device 8 or the marker section 78 is not captured (no marker is recognized).

When determining that no marker is recognized (NO in step S3), the CPU 11 sets the "non-pointing mode" in the operation mode data 207 of the process target player, in step S9. Thereafter, the process goes to step S11 described later.

On the other hand, when determining that the marker is recognized (YES in step S3), the CPU 11 determines, based on the acceleration of the controller 5, whether or not the attitude of the controller 5 of the process target player can be regarded as the horizontal attitude, in step S4. Specifically, the CPU 11 reads the acceleration data 205 from the memory 12, and determines whether or not the value of the Z-axis acceleration of the acceleration data 205 is smaller than 0.2. In the state where the controller 5 is substantially stationary, the acceleration applied to the controller 5 is equal to the gravitational acceleration. Accordingly, in this state, the direction (attitude) of the controller 5 with respect to the direction of the detected gravitational acceleration (gravity direction) can be calculated based on the acceleration data 205. In the exemplary embodiment, the correspondence relation between the value of the Z-axis acceleration and the direction of the front surface of the controller 5 is as shown in FIG. 18. First, the value of the Z-axis acceleration is in a range of +1 to −1. When the front surface of the controller 5 (the Z-axis positive direction in the local coordinate system of the controller) faces vertically downward, the Z-axis acceleration is "+1". When the front surface of the controller 5 faces vertically upward, the Z-axis acceleration is "−1". When the front surface of the controller 5 is in the horizontal state, the Z-axis acceleration is "0". Based on the above-mentioned relation, the CPU 11 determines whether or not the value of the z-axis acceleration is smaller than 0.2. When the value of the z-axis acceleration is smaller than 0.2, it is considered that the controller 5 is in the horizontal attitude or in the attitude that can be regarded as substantially horizontal (in other words, it is considered that the controller 5 is at least not in the downward attitude).

When determining that the value of the Z-axis acceleration is smaller than 0.2 (YES in step S4), the CPU 11 sets the "television mode" in the operation mode data 207 of the process target player, in step S10. Thereafter, the process goes to step S11 described later. On the other hand, when the value of the Z-axis acceleration is not smaller than 0.2 (NO in step S4), the CPU 11 determines whether or not the current operation mode is the "terminal apparatus mode", with reference to the operation mode data 207, in step S5. Based on the result of the determination, when the current operation mode is not the "terminal apparatus mode" (NO in step S5), it is considered that the player is in such a state that he/she has moved from the television 2 to the position of the terminal apparatus 7 and has just directed the controller 5 to the terminal apparatus 7. In this case, in step S6, the CPU 11 determines whether or not the controller 5 is in the downward attitude, based on the acceleration of the controller 5. In other words, the CPU 11 determines whether or not the terminal apparatus 7 is pointed to by the controller 5. Specifically, the CPU 11 reads the acceleration data 205 from the memory 12, and determines whether or not the value of the Z-axis acceleration of the acceleration data 205 is larger than 0.8. When determining that the value of the Z-axis acceleration is larger than 0.8 (YES in step S6), the CPU 11 sets the "terminal apparatus mode" in the operation mode data 207, in step S7. Thereafter, the process goes to step S11 described later. On the other hand, when the value of the Z-axis acceleration is not larger than 0.8 (NO in step S6), the CPU 11 sets the "non-pointing mode" in the operation mode data 207, in step S9. Thereafter, the process goes to step S11 described later.

On the other hand, when determining in step S5 that the current operation mode is the "terminal apparatus mode" (YES in step S5), the CPU 11 determines whether or not the value of the Z-axis acceleration is larger than 0.7, in step S8. Although the purpose of this determination is basically the same as the purpose of the determination in step S6, the threshold for the determination in step S8 is reduced a little. The reason is as follows. When the current operation mode is already the "terminal apparatus mode", it is considered that the state where the controller 5 points to the terminal apparatus 7 continues (for example, the water scooping operation continues). Then, in order to enhance the operability by making the operation mode hard to change (by making the downward attitude easy to be maintained), the determination is performed with the threshold being reduced a little. Thereby, it is possible to avoid the situation where the terminal apparatus mode is canceled during the water scooping operation, and the water scooping operation does not go well. Based on the result of the determination, when the value of the Z-axis acceleration is larger than 0.7 (YES in step S8), the process in step S7 is performed. On the other hand, when the value of the Z-axis acceleration is not larger than 0.7 (NO in step S8), the process in step S9 is performed.

Next, in step S11, the CPU 11 performs a game process according to the operation mode. Specifically, any of the following game processes is performed on the process target player.

[A. Process in Terminal Apparatus Mode]

When the marker is recognized and the operation mode data 207 represents the terminal apparatus mode, the CPU 11 calculates the pointing position on the LCD 71 based on the marker coordinate data 203. Then, the CPU 11 places, at the position, the ladle object 102 corresponding to the process target player. At this time, the CPU 11 appropriately calculates the attitude of the controller 5 based on the acceleration data and/or the marker coordinate data, and reflects the attitude of the controller 5 in the attitude of the ladle object 102.

Further, when the water scooping operation is performed (that is, when the determination result is NO in step S8), the CPU 11 turns on the water scooping flag 208, and sets a predetermined value, for example, "100", in the water amount data 209. At this time, a sound effect indicating that water is scooped may be output from the loudspeakers of the controller 5 and the terminal apparatus 7.

In addition, various game processes based on the assumption that the controller 5 points to the terminal apparatus 7 are appropriately performed.

[B. Process in Non-Pointing Mode]

When the operation mode data 207 represents the non-pointing mode, it is estimated that the controller 5 points neither to the television 2 nor to the terminal apparatus 7. At this time, the CPU 11 temporarily erases the ladle object 102 from the virtual game space so that the ladle object 102 is not included in the television game image or the terminal game image.

Further, with reference to the water scooping flag 208, the CPU 11 determines whether or not the process target player is moving from the terminal apparatus 7 toward the television 2. When the water scooping flag 208 is ON, it is estimated that the process target player is moving. At this time, the CPU 11 determines whether or not "vibration" occurs in the controller 5, based on the acceleration data 205 obtained from the controller 5. When such "vibration" occurs, the CPU 11 calculates the magnitude of the "vibration". The value of the water amount data 209 is gradually decreased in accordance with the magnitude of the "vibration". That is, a process is performed which reproduces a situation where water spills from the ladle in accordance with vibration of the ladle while the player is conveying water. In addition, in this process, a sound effect indicating that water spills from the ladle may be output from the loudspeaker of the controller 5.

In addition, various game processes based on the assumption that the controller 5 points neither to the television 2 nor to the terminal apparatus 7 are appropriately performed.

[C. Process in Television Mode]

When the operation mode data 207 represents the "television mode", it is estimated that the controller 5 points to the television 2. At this time, the CPU 11 calculates pointing coordinates on the screen, based on the marker coordinate data 203 obtained from the controller 5. Then, the CPU 11 places the ladle object 102 of the process target player at a position, in the virtual game space, corresponding to the pointing coordinates.

Further, the CPU 11 determines whether or not the water scooping flag 208 is ON. When the water scooping flag 208 is ON, the CPU 11 detects change in the attitude of the controller 5, based on the acceleration data 205 and/or the marker coordinate data 203. If attitude change (rotation about the Z-axis) like pouring of water into the container object occurs, the CPU 11 performs a process for displaying the state where an amount of the water object corresponding to the value of the water amount data 209 at this time is poured in the container object 101. In association with this process, the CPU 11 turns off the water scooping flag 208, and sets "0" in the water amount data 209.

In addition, various game processes based on the assumption that the controller 5 points to the television 2 are appropriately performed.

As described above, in step S11, the game process according to the operation mode is appropriately performed, and reflected in the state of the virtual game space.

Next, in step S12, the CPU 11 determines whether or not the above-mentioned processes have been performed on all the players. When unprocessed player(s) still remains (NO in step S12), the CPU 11 returns to step S1 to repeat the processes. On the other hand, when all the players have been processed (YES in step S12), in step S13, the CPU 11 generates a television game image and a terminal game image representing the virtual game space in which the game process in step S11 is reflected, and displays the images on the television 2 and the LCD 71, respectively.

This is the end of the description of the game processing according to the exemplary embodiment.

As described above, in the exemplary embodiment, the game using the two screens is played such that one of the two screens is placed so as to face in a direction along the gravity direction axis, while the other screen is placed so as to face in a direction along an axis different from the gravity direction axis (preferably, an axis perpendicular to the gravity direction axis). Then, which of the two screens thus placed is pointed is determined based on the acceleration data. Therefore, it is possible to perform the game processing in which the two screens placed as described above are appropriately used, by using the controller of the simple configuration such as a controller having an acceleration sensor, and thus the players are provided with a new way to play. In particular, by placing the television 2 and the terminal apparatus 7 at positions somewhat distant from each other, it is possible to provide the players with a new way to play that causes the players to perform dynamic actions.

In the exemplary embodiment, the terminal apparatus 7 is placed so that the LCD 71 faces upward. However, the terminal apparatus 7 may be placed at a position above the head of a player such that the LCD 71 faces vertically downward. In this case, determination as to whether the front surface of the controller 5 faces upward is performed instead of determining as to whether the front surface of the controller 5 faces downward in the exemplary embodiment.

Further, in the exemplary embodiment, the three operation modes, i.e., the television mode, the terminal apparatus mode, and the non-pointing mode, are adopted. However, the embodiment is not limited thereto. For example, only two operation modes, such as the television mode and the terminal apparatus mode, may be adopted. That is, game processing may be performed which is based on the assumption that the controller 5 always points to either the television 2 or the terminal apparatus 7.

Further, in the exemplary embodiment, it is determined which of the television 2 and the terminal apparatus 7 is pointed to by the controller 5, and a series of processes for performing game processing according to the determination result is performed in a single apparatus. In another exemplary embodiment, however, the series of processes may be performed in an information processing system that includes a plurality of information processing apparatuses. For example, in an information processing system that includes the game apparatus 3 and a server side apparatus capable of communicating with the game apparatus 3 via a network, a part of the series of processes may be performed by the server side apparatus. Alternatively, in an information processing system that includes the game apparatus 3 and a server side apparatus capable of communicating with the game apparatus 3 via a network, a main process of the series of the processes may be performed by the server side apparatus, and a part of the series of the processes may be performed by the game apparatus 3. Still alternatively, in the information processing system, a server side system may include a plurality of information processing apparatuses, and a process to be performed in the server side system may be divided and performed by the plurality of information processing apparatuses.

What is claimed is:

1. A game system which performs a predetermined game process, based on a position that is pointed to, on a screen of a display, by an operation device including a predetermined motion sensor, the game system comprising:

a first display device which is placed so that a display screen thereof faces in a direction along a gravity direction axis;

a second display device that is placed so that a display screen thereof faces in a direction along a predetermined axis direction perpendicular to the gravity direction axis, and a computer processor configured to perform at least:

attitude calculation for calculating an attitude of the operation device, based on data outputted from the motion sensor;

determination for determining which of the screen of the first display device and the screen of the second display device is pointed to by the operation device, based on the calculated attitude;

pointing processing for performing a process of pointing to a predetermined position on either the screen of the first display device or the screen of the second display device, based on a result of the determination; and game processing for performing the predetermined game process, based on the pointed position, wherein the game processing causes a player to perform a predetermined operation on the operation device in the state where the operation device is pointing to the screen of the first display device, thereby to perform a game process in which a predetermined object displayed on the screen of the first display device is taken by the operation device, and thereafter, the game processing causes the player to perform a predetermined operation in the state where the operation device is pointing to the second display device, thereby to perform a game process in which the object is moved into and displayed on the screen of the second display device.

2. The game system according to claim 1, wherein the determination determines whether the calculated attitude of the operation device is a first attitude in which, among outer surfaces of a casing of the operation device, a surface that is opposed to or substantially opposed to the display screen of the first display device or the display screen of the second display device when a player points to the display screen, faces in a direction along the gravity direction axis or a direction substantially along the gravity direction axis, or a second attitude in which the surface that is opposed to or substantially opposed to the display screen faces in a direction along a predetermined axis direction perpendicular to the gravity direction axis or a direction substantially along the predetermined axis direction, and the determination determines, when the attitude of the operation device is the first attitude, that the operation device points to the first display device, and determines, when the attitude of the operation device is the second attitude, that the operation device points to the second display device.

3. The game system according to claim 2, wherein the motion sensor is an acceleration sensor, and the attitude calculation determines the attitude of the operation device, based on acceleration data obtained from the acceleration sensor.

4. The game system according to claim 1, wherein the operation device further includes an image pickup, the game system further includes marker sections provided corresponding to the plurality of display devices, respectively, each of the marker sections is installed such that its direction is the same as the direction of the screen of the display device corresponding to the marker section, and the pointing processing includes pointed position calculation for calculating a pointed position on the screen, based on the position of the marker section in an image captured by the image pickup.

5. The game system according to claim 4, wherein each of the marker sections includes a light emitting member, the computer processor of the game system further performs lighting control for controlling lighting of the marker sections, the first display device is a display device that stores, in its casing, the marker section, and the second display device is a television, and the marker section corresponding to the television is installed in the vicinity of the television.

6. The game system according to claim 1, wherein the game processing includes:

attitude change detection detecting change in the attitude of the operation device, during a period from when the game process in which the predetermined object displayed on the screen of the first display device is taken by the operation device is performed to when the player performs the predetermined operation in the state where the operation device is pointing to the second display device;

parameter change for changing a predetermined parameter associated with the predetermined object, in accordance with a result of the detection by the attitude change detection; and reflection for, when the predetermined object is displayed on the screen of the second display device, reflecting the parameter changed by the parameter change, in the display of the object.

7. A non-transitory computer-readable storage medium having stored thereon a game program performed by a computer of a game system which performs a predetermined game process based on a position pointed to on a screen of a display by an operation device having a predetermined motion sensor, the game program causing the computer to perform at least:

attitude calculation for calculating an attitude of the operation device, based on data outputted from the motion sensor;

determination for determining, based on the calculated attitude, which of a display screen of a first display device that is placed so that the display screen faces in a direction along a gravity direction axis, and a display screen of a second display that is placed so that the display screen faces in a direction along a predetermined axis direction perpendicular to the gravity direction axis, is pointed to by the operation device;

pointing processing for performing a process of pointing to a predetermined position on either the screen of the first display device or the screen of the second display device, based on a result of the determination; and game processing for performing the predetermined game process, based on the pointed position, wherein the game processing causes a player to perform a predetermined operation on the operation device in the state where the operation device is pointing to the screen of the first display device, thereby to perform a game process in which a predetermined object displayed on the screen of the first display device is taken by the operation device, and thereafter, the games processing causes the player to perform a predetermined operation in the state where the operation device is pointing to the second display device, thereby to perform a game process in which the object is moved into and displayed on the screen of the second display device.

8. A game processing method for controlling a game system with a movement sensor, light emitting members, an image pickup element and a computer processor coupled to the movement sensor, the light emitting members, and the image pickup element, wherein the game system performs a predetermined game process based on a position pointed to on a screen of a display device by an operation device including the movement sensor, the game processing method comprising:

responsive to reception of an electrical signal generated by the movement sensor, calculating, via the computer processor, an attitude of the operation device, based on data outputted from the movement sensor;

determining, based on the calculated attitude, which of a display screen of a first display device that is placed so that the display screen faces in a direction along a gravity direction axis, and a display screen of a second display that is placed so that the display screen faces in a direction along a predetermined axis direction perpendicular to the gravity direction axis, is pointed to by the operation device, by programmatically comparing, using the computer processor, the data outputted from the movement sensor to predetermined thresholds, and generating an electronic message that includes an indication of the display screen pointed to by the operation device;

performing a process of pointing to a predetermined position on either the screen of the first display device or the screen of the second display device, based on the generated electronic message; and performing the predetermined game process, based on the pointed position, wherein the performing the predetermined game process causes a player to perform a predetermined operation on the operation device in the state where the operation device is pointing to the screen of the first display device, thereby to perform a game process in which a predetermined object displayed on the screen of the first display device is taken by the operation device, and thereafter, the performing the predetermined game process causes the player to perform a predetermined operation in the state where the operation device is pointing to the second display device, thereby to perform a game process in which the object is moved into and displayed on the screen of the second display device.

9. A game apparatus which obtains operation data from an operation device including a predetermined motion sensor, and outputs a predetermined game image generated by a predetermined game process based on the operation data, to each of display screens of a first display device and a second display device which are placed so that the directions of the screens are different from each other, the game, wherein the first display device is placed so that the display screen thereof faces in a direction along a gravity direction axis, and the second display device is placed so that the display screen thereof faces in a direction along a predetermined axis direction perpendicular to the gravity direction axis, and the game apparatus includes a computer processor configured to perform at least:

attitude calculation for calculating an attitude of the operation device, based on data outputted from the motion sensor;

determination for determining which of the screen of the first display device and the screen of the second display device is pointed to by the operation device, based on the calculated attitude;

pointing processing for performing a process of pointing to a predetermined position on either the screen of the first display device or the screen of the second display device, based on a result of the determination; and game processing for performing the predetermined game process, based on the pointed position, wherein the game processing causes a player to perform a predetermined operation on the operation device in the state where the operation device is pointing to the screen of the first display device, thereby to perform a game process in which a predetermined object displayed on the screen of the first display device is taken by the operation device, and thereafter, the game processing causes the player to perform a predetermined operation in the state where the operation device is pointing to the second display device, thereby to perform a game process in which the object is moved into and displayed on the screen of the second display device.

\* \* \* \* \*